(12) United States Patent
Senarath et al.

(10) Patent No.: US 10,742,522 B2
(45) Date of Patent: Aug. 11, 2020

(54) CREATION AND MODIFICATION OF SHAREABLE SLICE INSTANCES

(71) Applicants: Nimal Gamini Senarath, Ottawa (CA); Xu Li, Nepean (CA); Hamidreza Farmanbar, Ottawa (CA)

(72) Inventors: Nimal Gamini Senarath, Ottawa (CA); Xu Li, Nepean (CA); Hamidreza Farmanbar, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 153 days.

(21) Appl. No.: 15/808,349

(22) Filed: Nov. 9, 2017

(65) Prior Publication Data

US 2018/0139107 A1   May 17, 2018

Related U.S. Application Data

(60) Provisional application No. 62/421,566, filed on Nov. 14, 2016.

(51) Int. Cl.
*G06F 15/173* (2006.01)
*H04L 12/24* (2006.01)
(Continued)

(52) U.S. Cl.
CPC ...... *H04L 41/5003* (2013.01); *H04L 41/5019* (2013.01); *H04L 41/5067* (2013.01);
(Continued)

(58) Field of Classification Search
CPC ...... H04L 41/5003; H04L 41/12; H04L 47/70
(Continued)

(56) References Cited

U.S. PATENT DOCUMENTS 10,219,193 B2 *   2/2019   Kim ................. H04W 4/70
2015/0082308 A1   3/2015   Kiess et al.
(Continued)

FOREIGN PATENT DOCUMENTS

CN   103650437 A   3/2014
CN   104461744 A   3/2015
(Continued)

OTHER PUBLICATIONS

3GPP TR 23.799 V1.1.0 (Oct. 2016), 3rd Generation Partnership Project;Technical Specification Group Services and System Aspects;Study on Architecture for Next Generation System(Release 14), Oct. 2016. total 504 pages.
(Continued)

*Primary Examiner* — Bharat Barot

(57) ABSTRACT

A method for providing a service in a telecommunications network comprising a plurality of resources and at least one slice of resources. The method comprises actions of receiving, creating and modifying. A request is received from a customer to serve a group of user devices by a first service. A new NSI is created to provide the first service, if it is determined that there is no existing NSI, shareable between a plurality of services, that can provide the first service. An existing NSI, shareable between a plurality of services, is modified to serve the group of user devices by that first service in addition to at least one second service that is already provided by the existing NSI, if it is determined that the existing NSI can provide the first service.

26 Claims, 14 Drawing Sheets

(51) Int. Cl.
*H04L 12/911* (2013.01)
*H04L 12/725* (2013.01)
*H04L 12/26* (2006.01)
*H04L 12/803* (2013.01)

(52) U.S. Cl.
CPC ............ *H04L 45/302* (2013.01); *H04L 47/70* (2013.01); *H04L 47/78* (2013.01); *H04L 41/12* (2013.01); *H04L 43/08* (2013.01); *H04L 45/308* (2013.01); *H04L 47/125* (2013.01)

(58) Field of Classification Search
USPC .................................. 709/202–203, 225–226
See application file for complete search history.

(56) References Cited

U.S. PATENT DOCUMENTS

| | | | |
|---|---|---|---|
| 2017/0085493 A1* | 3/2017 | Senarath | ............... H04L 47/522 |
| 2017/0208019 A1 | 7/2017 | Shimojou et al. | |
| 2017/0269926 A1 | 9/2017 | Xu | |
| 2017/0289791 A1* | 10/2017 | Yoo | ........................ H04W 76/11 |
| 2018/0132138 A1* | 5/2018 | Senarath | ............. H04L 41/5041 |
| 2019/0109768 A1* | 4/2019 | Senarath | ............. H04L 41/5006 |
| 2019/0191309 A1* | 6/2019 | Kweon | ............... H04L 12/1407 |
| 2020/0053615 A1* | 2/2020 | Chiba | .................. H04W 8/065 |

FOREIGN PATENT DOCUMENTS

| | | |
|---|---|---|
| CN | 104468688 A | 3/2015 |
| CN | 105677433 A | 6/2016 |
| CN | 106060900 A | 10/2016 |
| WO | 2016152587 A1 | 9/2016 |

OTHER PUBLICATIONS

3GPP TR 28.801 V0.2.0 (Sep. 2016), 3rd Generation Partnership Project; Technical Specification Group Services and System Aspects; Telecommunication management;Study on management and orchestration of network slicing for next generation network (Release 14), 20 pages.

S5-166155 Huawei et al.,"Add requirements and update use case for modifying a network slice instance with common and slice specific CN functions and shared AN",3GPP TSG SA WG5 (Telecom Management) Meeting #110, Nov. 14-18, 2016, Reno (US),total 2 pages.

Tricci So et al.,"Research on Network Slicing Technology Supporting Multi-service", dated Jun. 16, 2016,total 7 pages with 11 pages English translation.

International Search Report dated Jan. 19, 2018 for corresponding International Application No. PCT/CN2017/110839 filed Nov. 14, 2017.

Zhigui et al., "Research on Network Slicing Technology Supporting Multi-service Designing Techniques of Posts and Telecom", Jul. 20, 2016.

Xu Yang et al., "Initial Analysis of 5G Mobile Network Slicing Technology Designing Techniques of Posts and Telecom", Jul. 31, 2016.

* cited by examiner

CREATION AND MODIFICATION OF SHAREABLE SLICE INSTANCES

RELATED APPLICATIONS

The present disclosure claims the benefit of priority to U.S. Provisional Patent Application Ser. No. 62/421,566 filed Nov. 14, 2016 and entitled "Creation and Modification of Shareable Slice Instances", the contents of which are incorporated by reference in their entirety herein.

TECHNICAL FIELD

The present disclosure relates to virtual telecommunications networks (VNs) and particular embodiments or aspects relate to instances of slices for VN services.

BACKGROUND

The demand for wireless resources in terms of bandwidth and throughput is ever increasing. One approach under consideration to meet this increasing demand is through virtualization of networks, in which network resources and functionality is downloaded into one or more existing network nodes to provide a dynamic service level capability for a customer service provider and its users as and when appropriate.

From the perspective of the customer, it has obtained a separate telecommunications network for its service(s), from the perspective of the mobile network operator (MNO) offering such service capability, the MNO's network resources and functions are shared with other VNs in a manner substantially transparent to the customer and its users.

In some approaches, a customer may subscribe for one or more so-called virtual network "slices" of network resources. Typically each network slice is dynamically allocated to provide certain relatively homogeneous kind and level of services to a group of relatively homogeneous end users or subscribers of the customer. In some examples, a plurality of the customer's end users may make up a user group of the customer. By way of non-limiting example, a customer may be any one or more of a corporate customer, a mobile virtual network operator (MVNO) and a vertical service provider such as, by way of non-limiting example, a vehicle to vehicle (V2V) service provider, a streaming service provider, and/or an electrical meter reading service provider. By way of non-limiting example, a network slice may be allocated to a customer to provide service level capability to a utility subscriber and its remotely-located smart-meters. In some examples, the service is provided in a network slice.

The allocation of one or more network slices of network resources in a network node involves the instantiation of a network slice, for example by downloading from cloud-based resources, of certain network functionality into an existing network node.

In some examples, the network slice instance (NSI) is created exclusively for the VN service. FIG. 11 is a block diagram showing an example of the life cycle of an NSI that is created exclusively for a VN service.

The process begins with a customer request 1110 for a VN service from the MNO. In some cases, the customer is provided with access to a network capability database 1120 of the MNO to understand what service types and/or configurations the MNO can provide. Eventually, assuming that the customer sees that the capability to service the customer request is available, the customer negotiates with the MNO and the customer request is formalized into a service level agreement (SLA) 1130 that defines the service capability that the MNO will provide to the customer in support of the service request for use by the customer's end users The SLA 1130 may specify such details such as the particular end user authentication mechanism, the demands expected of the customer's different end users or devices, or of groups of end users or devices, relative priorities to be assigned to different functions and processing, techniques to control overloading, performance monitoring and feedback criteria, charging policies and overall policies such as how and when the service capability can be amended and/or renegotiated.

The NSI may be created from a network slice template (NST). The NST describes the function chains that will be instantiated to provide the service capability defined by the SLA 1130. In some cases, there is an existing NST that is suitable, in that the NST matches or otherwise can provide or support the requested VN service capabilities, that can be accessed from an NST database 1140.

However, in some cases there is no existing NST that would be suitable to satisfy the capabilities defined by the SLA 1130, and a new NST is created and may be added to the NST database 1140.

However arrived at, the capabilities of the function chains of the selected NST may then be fleshed out or completed in a network slice descriptor (NSD) 1150. The NSD 1150 adds further details by defining and assigning values to the various attributes described and/or listed in the selected NST corresponding to the services that the NSI intends to support. Such attributes may be related to the NF, performance, faults, charging, transport link, isolation and/or security to define capabilities corresponding to and to give effect to the VN service covered by the SLA 1130.

NF attributes may include without limitation, admission control, capacity in terms of number of users, storage, latency (function execution speed), usage monitoring relating to a specific service, slice and/or flow), traffic throughput, location, geography, communication speed (along connected transport links, including without limitation in the cloud), times related to virtual function life cycle actions (activation time, deactivation time, creation time and/or termination time) and/or resources for each of the functions as well as the specific topology of the functions to be instantiated.

Performance-related attributes may include, without limitation, overall capacity, QoE, network key performance indicators (KPI) and/or individual end-user related performance.

Transport link-related attributes may include, without limitation, link end points, link usage methods, capacity, quality of experience (QoE) and/or quality of service (QoS).

Once the NSD 1150 has been defined and/or refined sufficiently, the NSI can be instantiated or created 1160 and the corresponding network functions (NFs) and resources configured and allocated. As well, a customer service instance (CSI) may be correspondingly created 1165. The CSI handles the interactions 1161 of the customer and its users with the NSI.

Once the NSI has been created 1160 with the CSI 1165, the NSI enters an operational mode 1170 and the CSI enters an operational mode 1175 with interactions 1171 therebetween, during which the end user traffic of the VN service instantiated by the NSI is handled.

During the operational mode 1170, the MNO attempts to ensure that both the) KPI of the network, the QoE of the services provided by the NSI and the QoE of the customer's individual end users are satisfied by monitoring the NSI. Furthermore, the MNO handles end user authentication for new sessions, performs traffic routing and/or traffic monitoring and handles accounting and charging.

From time to time, there may be requests for modification of the configuration of the NSI 1180. The request may be internally generated by the MNO if the KPI and/or QoE are not being satisfied. Alternatively, the request may originate from the CSI 1185 and communicated to the NSI 1181. In either case, an NSI modification function 1182 may be invoked, whereby the configuration of the NSI is altered before the operational mode 1170 is resumed.

Eventually, the VN service will be terminated, which may be communicated 1191 from the CSI to the NSI, resulting in termination of both the CSI 1195 and the NSI 1190.

In some cases, the MNO may expect the receipt from different customers, of VN service requests of the same or a similar type. Alternatively a customer may request the capability and/or the MNO may wish to add additional requested VN services of a similar type to an existing NSI, without terminating the NSI and creating a NSI with expanded service capability. Accordingly, there may be a need for a system and method for instances of slices for VN services that is not subject to one or more limitations of the prior art.

This background is intended to provide information that may be of possible relevance to the present invention No admission is necessarily intended, nor should be construed, that any of the preceding information constitutes prior art against the present invention.

SUMMARY

It is an object of the present disclosure to obviate or mitigate at least one disadvantage of the prior art.

According to a first broad aspect of the present disclosure, there is disclosed a method for providing a service in a telecommunications network comprising a plurality of resources and at least one slice of resources. The method comprises actions of receiving, creating and modifying. The action of receiving comprises receiving a request to serve a group of user devices by a first service. The action of creating comprises creating an NSI to provide the first service, if it is determined that there is no existing NSI, shareable between a plurality of services, that can provide the first service. The action of modifying comprises modifying an existing NSI, shareable between a plurality of services, to serve the group of user devices by that first service in addition to at least one second service that is already provided by the existing NSI.

In an embodiment, the first service can be provided in one of the at least one slices of resources.

In an embodiment, the first service and the at least one second service can comprise a common chain of NFs.

In an embodiment, the action of receiving can comprise negotiating with the customer for a service capability that will be provided in the first service.

In an embodiment, the action of creating can comprise defining capabilities corresponding to the first service of at least one NF in a function chain specified in an NST from which the NSI was created. In an embodiment, the action of defining can comprise defining a capability selected from a group consisting of NF-related attributes, performance-related attributes, fault-related attributes, charging-related attributes, transport link-related attributes, isolation-related attributes, security-related attributes and any combination of any of these. In an embodiment, the NF-related attributes can be selected from a group consisting of admission control, capacity, storage, latency, usage monitoring, throughput, location, geography, communication speed, scalability, admission of a new service, activation time, deactivation time, creation time, termination time, resources and any combination of any of these. In an embodiment, the performance-related attributes can be selected from a group consisting of overall capacity, QoE, network KPI, individual end-user performance and any combination of any of these. In an embodiment, the transport link-related attributes can be selected from a group consisting of link end points, link usage methods, capacity, QoE, QoS and any combination of any of these. In an embodiment, the action of defining can comprise defining a topology of the function chain.

In an embodiment, the action of modifying can comprise defining capabilities corresponding to the first service of at least one NF in a function chain specified in an NST from which the NSI was created.

In an embodiment, the action of defining can comprise defining a capability of the NF selected from a group consisting of NF-related attributes, performance-related attributes, fault-related attributes, charging-related attributes, transport link-related attributes, isolation-related attributes, security-related attributes and any combination of any of these. In an embodiment, the NF-related attributes can be selected from a group consisting of admission control, capacity, storage, latency, usage monitoring, throughput, location, geography, communication speed, scalability, admission of a new service, activation time, deactivation time, creation time, termination time, resources and any combination of any of these. In an embodiment, the performance-related attributes can be selected from a group consisting of overall capacity, QoE, network KPI, individual end-user related performance and any combination of any of these. In an embodiment, the transport link-related attributes can be selected from a group consisting of link end points, link usage methods, capacity, QoE, QoS and any combination of any of these. In an embodiment, the action of defining can comprise defining a topology for the function chain.

In an embodiment, the method can further comprise the action of operating the NSI providing the first service. In an embodiment, the action of operating can comprise monitoring a performance metric selected from a group consisting of a KPI of the network, a QoE of a service provided by the NSI and any combination of any of these. In an embodiment, the action of operating can comprise performing an activity selected from a group consisting of end user authentication, traffic routing, traffic monitoring, accounting, charging and any combination of any of these.

In an embodiment, the method can further comprise the action of receiving a modification request. In an embodiment, the action of receiving a modification request can comprise modifying the NSI in accordance with the modification request. In an embodiment, the action of modifying the NSI in accordance with the modification request can further comprise operating the NSI after modifying it. In an embodiment, the modification request can comprise a request to terminate the first service. In an embodiment, if the first service is the only service sharing the NSI, the action of receiving a request to terminate the first service can comprise terminating the NSI. In an embodiment, if the first service is not the only service sharing the NSi, the action of receiving a request to terminate the first service can comprise modifying the NSI to remove the first service.

Embodiments have been described above in conjunction with aspects of the present disclosure upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

Some aspects and embodiments of the present disclosure may provide a mechanism to add additional requested VN services of a similar type to an existing NSI, without terminating the NSI and creating an NSI with expanded service capability.

BRIEF DESCRIPTION OF THE DRAWINGS

Example embodiments of the present disclosure will now be described by reference to the following figures, in which identical reference numerals in different figures indicate identical elements and in which.

Figure 1:
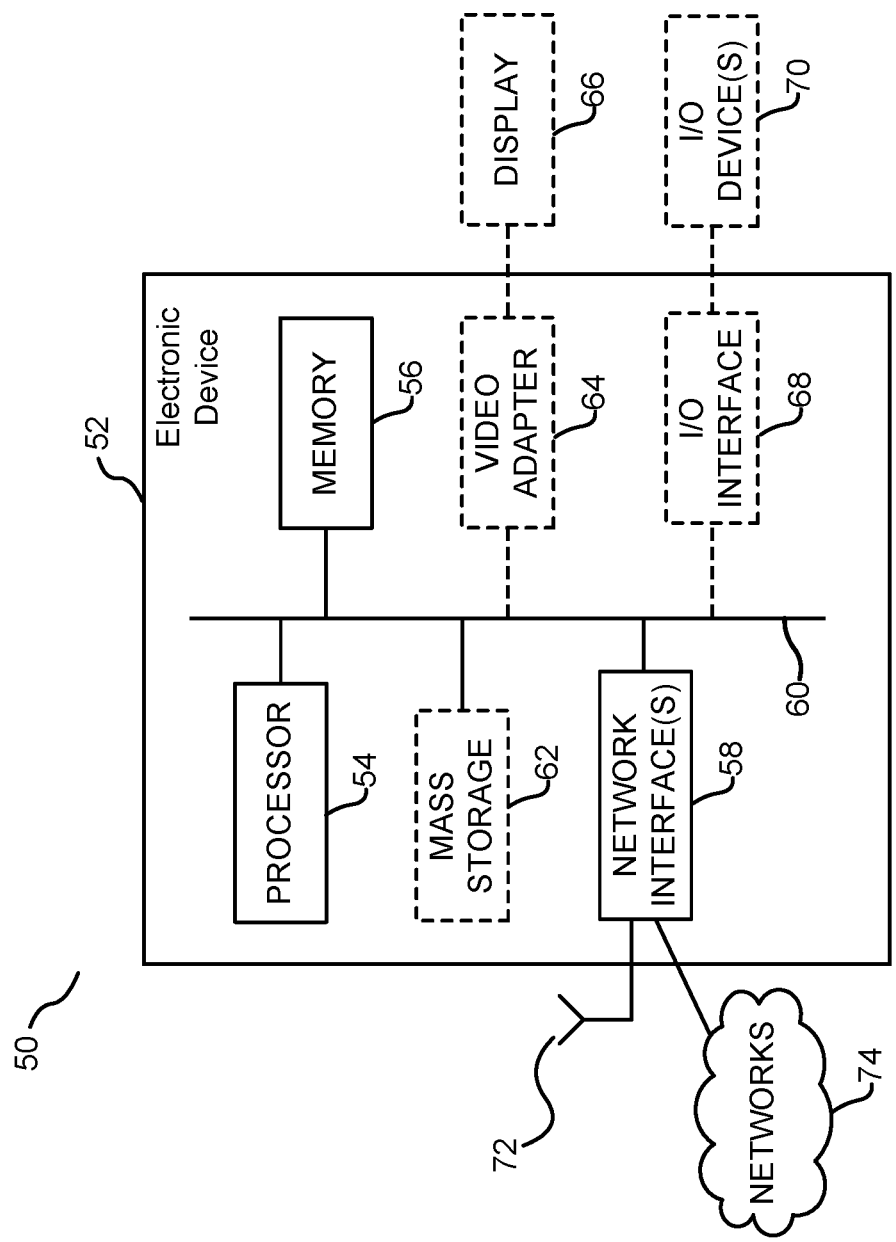
FIG. 1 is a block diagram of an electronic device within a computing and communications environment 50 that may be used for implementing devices and methods in accordance with representative embodiments of the present disclosure.

In the present disclosure, for purposes of explanation and not limitation, specific details are set forth in order to provide a thorough understanding of the present disclosure. In some instances, detailed descriptions of well-known devices, circuits and methods are omitted so as not to obscure the description of the present disclosure with unnecessary detail.

Accordingly, the system and method components have been represented where appropriate by conventional symbols in the drawings, showing only those specific details that are pertinent to understanding the embodiments of the present disclosure, so as not to obscure the disclosure with details that will be readily apparent to those of ordinary skill in the art having the benefit of the description herein.

Any feature or action shown in dashed outline may in some example embodiments be considered as optional.

DESCRIPTION

FIG. 1 is a block diagram of an electronic device (ED) 52 illustrated within a computing and communications environment 50 that may be used for implementing the devices and methods disclosed herein. In some embodiments, the ED 52 may be an element of communications network infrastructure, such as a base station (for example a NodeB, an evolved Node B (eNodeB or eNB), a next generation NodeB (sometimes referred to as a gNodeB or gNB), a home subscriber server (HSS), a gateway (GVV) such as a packet gateway (PGVV) or a serving gateway (SGVV) or various other nodes or functions within a core network (CN) or Public Land Mobility Network (PLMN). In other embodiments, the ED 52 may be device that connects to the network infrastructure over a radio interface, such as a mobile phone, smart phone or other such device that may be classified as a User Equipment (UE). In some embodiments, the ED 52 may be a Machine Type Communications (MTC) device (also referred to as a machine-to-machine (m2m) device), or another such device that may be categorized as a UE despite not providing a direct service to a user. In some references, an ED 52 may also be referred to as a mobile device, a term intended to reflect devices that connect to a mobile network, regardless of whether the device itself is designed for, or capable of, mobility. Specific devices may utilize all of the components shown or only a subset of the components, and levels of integration may vary from device to device. Furthermore, a device may contain multiple instances of a component, such as multiple processors, memories, transmitters, receivers, etc. The ED 52 typically includes a processor 54, such as a Central Processing Unit (CPU) and may further include specialized processors such as a Graphics Processing Unit (GPU) or other such processor, a memory 56, a network interface 58 and a bus 60 to connect the components of ED 52. ED 52 may optionally also include components such as a mass storage device 62, a video adapter 64, and an I/O interface 68 (shown in dashed outline).

The memory 56 may comprise any type of non-transitory system memory, readable by the processor 54, such as static random access memory (SRAM), dynamic random access memory (DRAM), synchronous DRAM (SDRAM), read-only memory (ROM), or a combination thereof. In an embodiment, the memory 56 may include more than one type of memory, such as ROM for use at boot-up, and DRAM for program and data storage for use while executing programs. The bus 60 may be one or more of any type of several bus architectures including a memory bus or memory controller, a peripheral bus, or a video bus.

The ED 52 may also include one or more network interfaces 58, which may include at least one of wired network interface and a wireless network interface. As illustrated in FIG. 1, a network interface 58 may include a wired network interface to connect to a network 74, and also may include a radio access network interface 72 for connecting to other devices over a radio link. When ED 52 is a network infrastructure element, the radio access network interface 72 may be omitted for nodes or functions acting as elements of the PLMN other than those at the radio edge (eg.

an eNB). When ED 52 is infrastructure at the radio edge of a network 74, both wired and wireless network interfaces may be included. When ED 52 is a wirelessly connected device, such as a UE, radio access network interface 72 may be present and it may be supplemented by other wireless interfaces such as WiFi network interfaces. The network interfaces 58 allow the ED 52 to communicate with remote entities such as those connected to network 74.

The mass storage 62 may comprise any type of non-transitory storage device configured to store data, programs and other information and to make the data, programs and other information accessible via the bus 60. The mass storage 62 may comprise, for example, one or more of a solid state drive, hard disk drive, a magnetic disk drive or an optical disk drive. In some embodiments, mass storage 62 may be remote to ED 52 and accessible through use of a network interface such as interface 58. In the illustrated embodiment, mass storage 62 is distinct from memory 56 where it is included, and may generally perform storage tasks compatible with higher latency, but may generally provide lesser or no volatility. In some embodiments, mass storage 62 may be integrated with a heterogeneous memory 56.

The optional video adapter 64 and the I/O interface 68 (shown in dashed outline) provide interface to couple the ED 52 to external input and output devices. Examples of input and output devices include a display 66 coupled to the video adapter 64 and an I/O device 70 such as a touch-screen coupled to the I/O interface 68. Other devices may be coupled to the ED 52, and additional or fewer interfaces may be utilized. For example, a serial interface such as a Universal Serial Bus (USB) (not shown) may be used to provide an interface for an external device. Those skilled in the art will appreciate that in embodiments in which ED 52 is part of a data center, I/O interface 68 and Video Adapter 64 may be virtualized and provided through network interface 58.

In some embodiments, ED 52 may be a stand-alone device, while in other embodiments ED 52 may be resident within a data center. A data center, as will be understood in the art, is a collection of computing resources (typically in the form of services) that can be used as a collective computing and storage resource. Within a data center, a plurality of services can be connected together to provide a computing resource pool upon which virtualized entities can be instantiated. Data centers can be interconnected with each other to form networks consisting of pooled computing and storage resources connected to each other by connectivity resources. The connectivity resources may take the form of physical connections such as Ethernet or optical communications links, and in some instances may include wireless communication channels as well. If two different data centers are connected by a plurality of different communication channels, the links can be combined together using any of a number of techniques including the formation of link aggregation groups (LAGs). It should be understood that any or all of the computing, storage and connectivity resources (along with other resources within the network 74) can be divided between different sub-networks, in some cases in the form of a resource slice. If the resources across a number of connected data centers or other collection of nodes are sliced, different network slices can be created.

Figure 2:
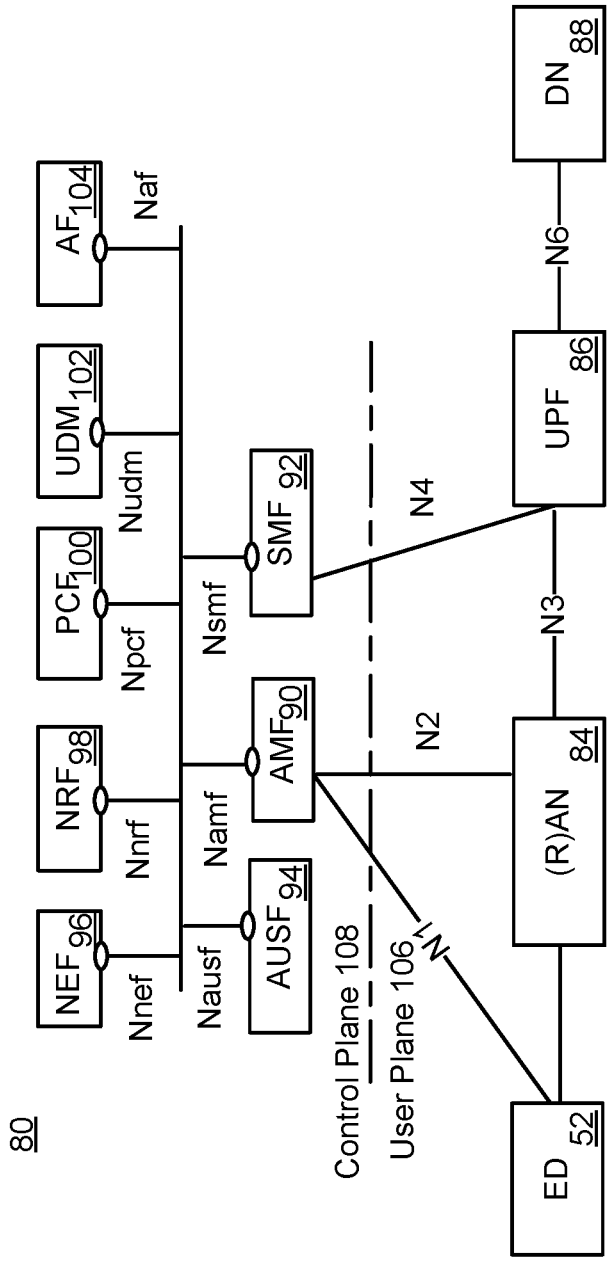
FIG. 2 is a block diagram illustrating a service-based view of a system architecture of a 5G Core Network.

FIG. 2 illustrates a service-based architecture 80 for a 5G or Next generation Core Network (5GCN/NGCN/NCN). This illustration depicts logical connections between nodes and functions, and its illustrated connections should not be interpreted as direct physical connection. ED 50 forms a radio access network connection with a (Radio) Access Network node (R)AN 84, which is connected to a User Plane (UP) Function (UPF) 86 such as a UP Gateway of a network interface such as an N3 interface. UPF 86 connected to a Data Network (DN) 88 over a network interface such as an N6 interface. DN 88 may be a data network used to provide an operator service, or it may be outside the scope of the standardization of the Third Generation Partnership Project (3GPP), such as the Internet, a network used to provide third party service, and in some embodiments DN 88 may represent an Edge Computing network or resources, such as a Mobile Edge Computing (MEC) network. ED 52 also connects to the Access and Mobility Management Function (AMF) 90. The AMF 90 is responsible for authentication and authorization of access requests, as well as mobility management functions. The AMF 90 may perform other roles and functions as defined by the 3GPP Technical Specification (TS) 23.501. In a service-based view, AMF 90 can communicate with other functions through a service-based interface denoted as Namf. The Session Management Function (SMF) 92 is an NF that is responsible for the allocation and management of IP addresses that are assigned to a UE as well as the selection of a UPF 86 (or a particular instance of a UPF 86) for traffic associated with a particular session of ED 52. The SMF 92 can communicate with other functions, in a service-based view, through a service-based interface denoted as Nsmf. The Authentication Server function (AUSF) 94 provides authentication services to other NFs over a service-based Nausf interface. A Network Exposure Function (NEF) 96 can be deployed in the network to allow servers, functions and other entities such as those outside a trusted domain to have exposure to services and capabilities within the network. In one such example, the NEF 96 can act much like a proxy between an application server outside the illustrated network and NFs such as the Policy Control Function (PCF) 100, the SMF 92 and the AMF 90, so that the external application server can provide information that may be of use in the setup of the parameters associated with a data session. The NEF 96 can communicate with other NFs through a service-based Nnef network interface. The NEF 96 may also have an interface to non-3GPP functions. A Network Repository Function (NRF) 98, provides network service discovery functionality. The NRF 98 may be specific to the PLMN or network operator, with which it is associated. The service discovery functionality can allow NFs and UEs connected to the network to determine where and how to access existing NFs, and may present the service-based interface Nnrf. PCF 100 communicates with other NFs over a service-based Npcf interface, and can be used to provide policy and rules to other NFs, including those within the control plane (CP) 108. Enforcement and application of the policies and rules is not necessarily the responsibility of the PCF 100, and is instead typically the responsibility of the functions to which the PCF 100 transmits the policy. In one such example the PCF 100 may transmit policy associated with session management to the SMF 92. This may be used to allow for a unified policy framework with which network behaviour can be governed. A Unified Data Management Function (UDM) 102 can present a service based Nudm interface to communicate with other NFs, and can provide data storage facilities to other NFs. Unified data storage can allow for a consolidated view of network information that can be used to ensure that the most relevant information can be made available to different NFs from a single resource. This can make implementation of other NFs easier, as they do not need to determine where a particular type of data is stored in the network. The UDM 102 may be implemented as a UDM Front End (UDM-FE)

and a User Data Repository (UDR). The PCF 100 may be associated with the UDM 102 because it may be involved with requesting and providing subscription policy information to the UDR, but it should be understood that typically the PCF 100 and the UDM 102 are independent functions. The PCF 100 may have a direct interface to the UDR. The UDM-FE receives requests for content stored in the UDR, or requests for storage of content in the UDR, and is typically responsible for functionality such as the processing of credentials, location management and subscription management. The UDR-FE may also support any or all of authentication credential processing, user identification handling, access authorization, registration/mobility management, subscription management and Short Message Service (SMS) management. The UDR is typically responsible for storing data provided by the UDM-FE. The stored data is typically associated with policy profile information (which may be provided by PCF 100) that governs the access rights to the stored data. In some embodiment, the UDR may store policy data, as well as user subscription data which may include any or all of subscription identifiers, security credentials, access and mobility related subscription data and session related data. Application Function (AF) 104 represents the non-data plane also referred to as the non-user plane) functionality of an application deployed within a network operator domain and within a 3GPP-compliant network. The AF 104 interacts with other core NFs through a service-based Naf interface, and may access network capability exposure information, as well as provide application information for use in decisions such as traffic routing. The AF 104 can also interact with functions such as the PCF 100 to provide application-specific input into policy and policy enforcement decisions. It should be understood that in many situations the AF 104 does not provide network services to other NFs, and instead is often viewed as consumer or user of services provided by other NFs. An application outside the 3GPP network can perform many of the same functions as AF 104 through the use of NEF 96.

ED 52 communicates with NFs that are in the UP 106, and the CP 108. The UPF 86 is a part of the CN UP 106 (DN 88 being outside the 5GCN). (R)AN 84 may be considered as a part of a UP, but because it is not strictly a part of the CN, it is not considered to be a part of the CN UP 106. AMF 90, SMF 92, AUSF 94, NEF 96, NRF 98, PCF 100 and UDM 102 are functions that reside within the CN CP 108, and are often referred to as CP Functions (CPFs). AF 104 may communicate with other functions within CN CP 108 (either directly or indirectly through the NEF 96), but is typically not considered to be a part of the CN CP 108.

Those skilled in the art will appreciate that there may be a plurality of UPFs 86 connected in series between the (R)AN 84 and the DN 88, and as will be discussed with respect to FIG. 3, multiple data sessions to different DNs can be accommodated through the use of multiple UPFs in parallel.

Figure 3:
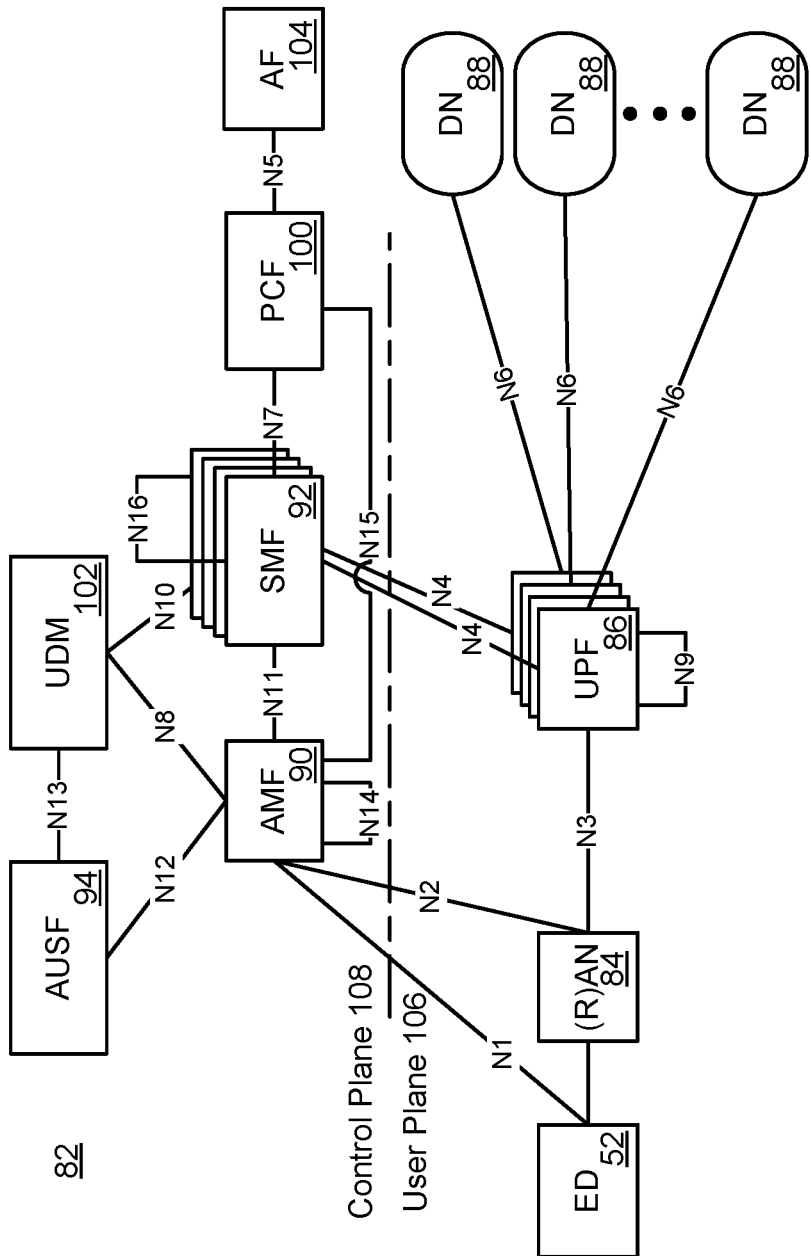
FIG. 3 is a block diagram illustrating the system architecture of a 5G Core network as shown in FIG. 2 from the perspective of reference point connectivity.

FIG. 3 illustrates a reference point representation of a 5GCN architecture 82. For the sake of clarify, some of the NFs illustrated in FIG. 2 are omitted from this figure, but it should be understood that the omitted functions and those not illustrated in either FIG. 2 or FIG. 3) can interact with the illustrated functions.

ED 52 connects to both (R)AN 84 (in the UP 106) and AMF 90 (in the CP 108). The ED-to-AMF connection is an N1 connection. (R)AN 84 also connects to the AMF 90, and does so over an N2 connection. The (R)AN 84 connects to a UPF function 86 of an N3 connection. The UPF 86 is associated with a PDU session, and connects to the SMF 92 over an N4 interface to receive session control information. If the ED 52 has multiple PDU sessions active, they can be supported by multiple different UPFs 86, each of which is connected to an SMF 92 over an N4 interface. It should be understood that from the perspective of reference point representation, multiple instances of either an SMF 92 or an UPF 86 are considered as distinct entities. The UPFs 86 each connect to a DN 88 outside the 5GCN over an N6 interface. SMF 92 connects to the PCF 100 over an N7 interface, while the PCF 100 connects to an AF 104 over an N5 interface. The AMF 90 connects to the UDM 102 over an N8 interface. If two UPFs 86 in UP 106 connect to each other, they can do so over an N9 interface. The UDM 102 can connect to an SMF 92 over an N10 interface. The AMF 90 and SMF 92 connect to each other over an N11 interface. An N12 interface connects the AUSF 94 to the AMF 90. The AUSF 94 can connect to the UDM 102 over an N13 interface. In networks in which there is a plurality of AMFs 90, they can connect to each other over an N14 interface. The PCF 100 can connect to an AMF 90 over the N15 interface. If there is a plurality of SMFs 92 in the network, they can communicate with each other over an N16 interface.

It should also be understood that any or all of the functions and nodes, discussed above with respect to the architectures 80 and 82 of the 5GCN, may be virtualized within a network, and the network itself may be provided as network slice of a larger resource pool, as will be discussed below.

Figure 4:
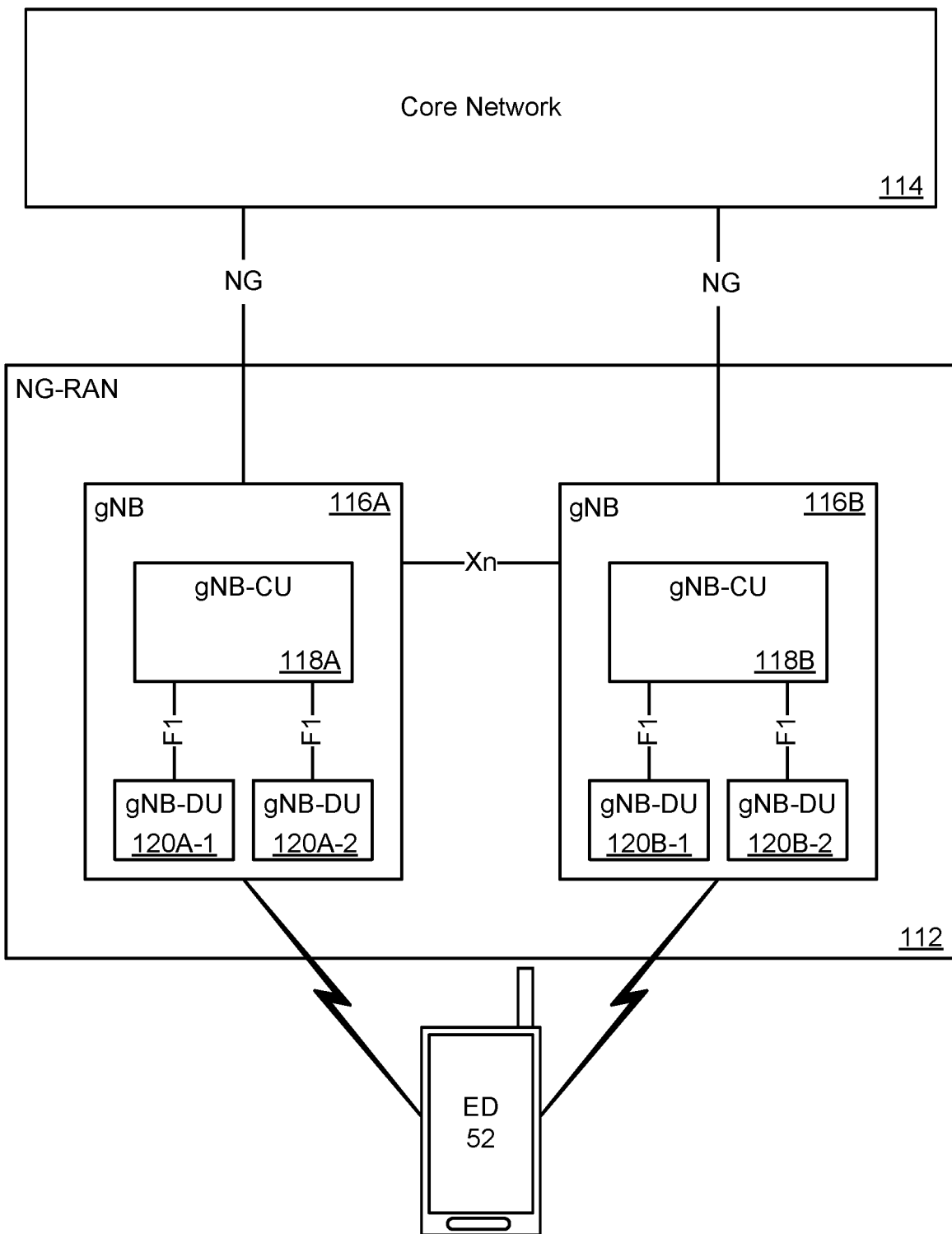
FIG. 4 is a block diagram illustrating an architecture of a 5G Radio Access network architecture.

FIG. 4 illustrates a proposed architecture 110 for the implementation of a Next Generation Radio Access network (NG-RAN) 112, also referred to as a 5G RAN. NG-RAN 112 is the radio access network that connects an ED 52 to a CN 114. Those skilled in the art will appreciate that CN 114 may be the 5GCN (as illustrated in FIG. 2 and FIG. 3). In other embodiments, the CN 114 may be a 4G Evolved Packet Core (EPC) network. Nodes with NG-RAN 112 connect to the 5G CN 114 over an NG interface. This NG interface can comprise both the N2 interface to a CP 108 and an N3 interface to a UPF 86 as illustrated in FIG. 2 and FIG. 3. The N3 interface can provide a connection to a CN UPF. NG-RAN 112 includes a plurality of radio access nodes that can be referred to as a gNB. In the NG-RAN 112, gNB 116A and gNB 116B are able to communicate with each other over an Xn interface. Within a single gNB 116A, the functionality of the gNB may be decomposed into a Centralized Unit (gNB-CU) 118A and a set of distributed units (gNB-DU 120A-1 and gnB-DU 120A-2, collectively referred to as 120A). gNB-CU 118A is connected to a gNB-DU 120A over an F1 interface. Similarly gNB 116B has a gNB-CU 118B connecting to a set of distributed units gNB-DU 120B-1 and gNB-DU 120B-2, collectively referred to as 120B). Each gNB DU may be responsible for one or more cells providing radio coverage within the PLMN.

The division of responsibilities between the gNB-CU and the gNB-DU has not been fully defined at this time. Different functions, such as the radio resource management functionality may be placed in one of the CU and the DU. As with all functional placements, there may be advantages and disadvantages to placement of a particular NF in one or the other location. It should also be understood that any or all of the functions discussed above with respect to the NG-RAN 112 may be virtualized within a network, and the network itself may be provided as network slice of a larger resource pool, as will be discussed below.

Figure 5:
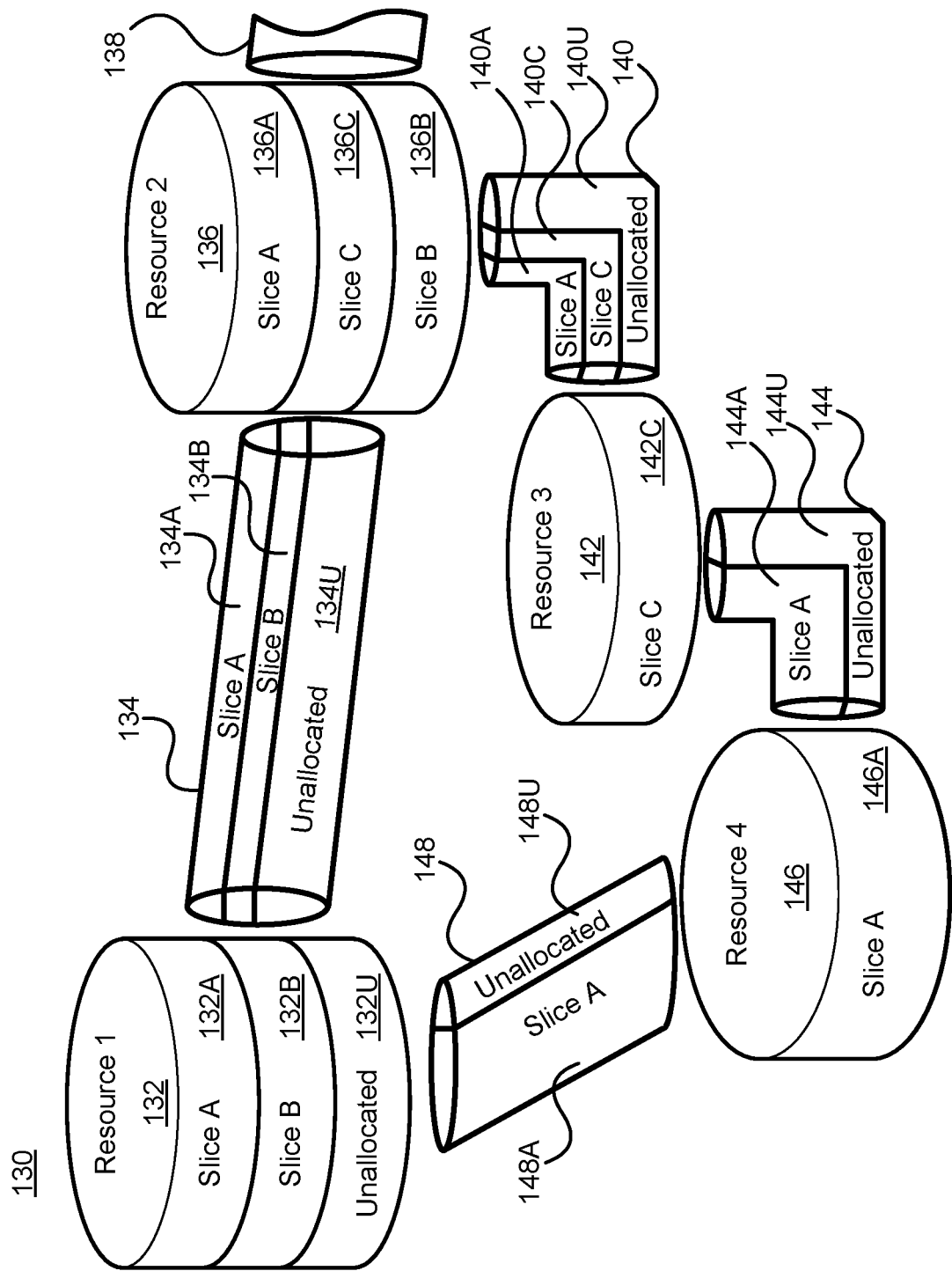
FIG. 5 is a block diagram schematically illustrating an architecture in which network slicing can be implemented.

FIG. 5 illustrates an architecture 130 that connects a plurality of connectivity, compute and storage resources, and supports network slicing. In the following, resources are connected to other discrete resources through Connectivity Resources 134, 138, 140, 144 and 148. It will be understood that as NFs are instantiated within resources, they may be connected to each other by virtual connections that in some embodiments do not rely upon the physical connectivity resources illustrated, but instead may be connected to each other by virtual connections, which will also be considered as connectivity resources. Resource 1 132 is connected to Resource 2 136 by Connectivity Resource 134. Resource 2 136 is connected to unillustrated resources through Connectivity Resource 138, and is also connected to Resource 3 142 by Connectivity Resource 140, and Resource 1 132 is connected to Resource 4 146 by Connectivity Resource 148. Resource 1 132, Resource 2 136, Resource 3 142 and Resource 4 146 should be understood as representing both compute and storage resources, although specialized functions may also be included. In some embodiments, a specialized NF may be represented by any or all of Resource 1 132, Resource 2 136, Resource 3 142 and Resource 4 146, in which case, it may be the capability or capacity of the NF that is being sliced. Connectivity Resources 134, 138, 140, 144 and 148 may be considered, for the following discussions, as logical links between two points (eg. between two data centers) and may be based on a set of physical connections.

Resource 1 132 is partitioned to allocate resources to Slice A 132A, and Slice B 132B. A portion 132U of the resources available to Resource 1 132 remains unallocated. Those skilled in the art will appreciate that upon allocation of the network resources to different slices, the allocated resources are isolated from each other. This isolation, both in the compute and storage resources, ensures that processes in one slice do not interact or interfere with the processes and functions of the other slices. This isolation can be extended to the connectivity resources as well. Connectivity Resource 134 is partitioned to provide connectivity to Slice A 134A and Slice B 134B, and also retains some unallocated bandwidth 134U. it should be understood that in any resource that either has unallocated resources or that has been partitioned to support a plurality of resources, the amount of the resource (eg. the allocated bandwidth, memory, or number of processor cycles) can be varied or adjusted to allow changes to the capacity of each slice. In some embodiments, slices are able to support "breathing", which allows the resources allocated to the slice to increase and decrease along with any of the available resources, the required resources, anticipated resource need, or other such factors, alone or in combination with each other. In some embodiments, the allocation of resources may be in the form of soft slices in which a fixed allocation is not committed and instead the amount of the resource provided may be flexible. In some embodiments, a soft allocation may allocate a percentage of the resource to be provided over a given time window, for example 50% of the bandwidth of a connection over a time window. This may be accompanied by a minimum guaranteed allocation. Receiving a guarantee of 50% of the capacity of a connectivity resource at all times may provide very different service characteristics than receiving 50% of the capacity of the connectivity resource over a ten second window.

Resource 2 136 is partitioned to support allocations of the available compute and storage resources to Slice A 136A, Slice C 136C and Slice B 136B. Because there is no allocation of resources in connectivity resource 134 to Slice C, Resource 2 136 may, in some embodiments, not provide a network interface to Slice C 136C to interact with connectivity resource 134. Resource 2 136 can provide an interface to different slices to Connectivity Resource 138 in accordance with the slices supported by Connectivity Resource 138. Connectivity Resource 140 is allocated to Slice A 140A and Slice C 140C with some unallocated capacity 140U. Connectivity Resource 140 connects Resource 2 136 with Resource 3 142.

Resource 3 142 provides compute and storage resources that are allocated exclusively to Slice C 142C, and is also connected to Connectivity Resource 144 which in addition to the unallocated portion 144U includes an allocation of Connectivity Resource 144A to slice A. it should be noted that from the perspective of functions or processes within Slice A, Resource 3 142 may not be visible. Connectivity Resource 144 provides a connection between Resource 3 142 and Resource 4 146, whose resources are allocated entirely to Slice A 146.

Resource 4 146 is connected to Resource 1 132 by Connectivity Resource 148, which has a portion of the connection allocated to Slice A 148, while the balance of the resources 148U are unallocated.

Figure 6:
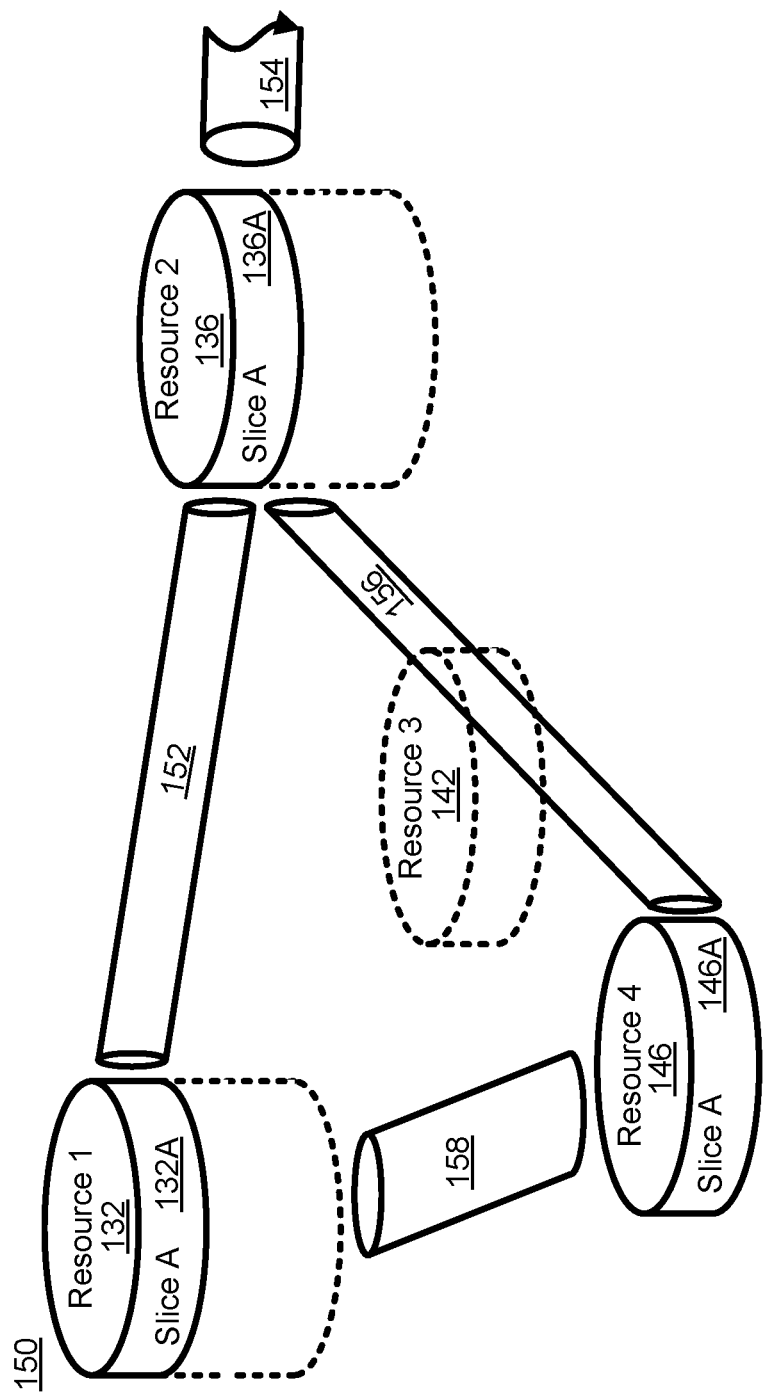
FIG. 6 is a block diagram illustrating the architecture discussed in FIG. 5 from the perspective of a single slice.

FIG. 6 illustrates the view of the architecture 136 of FIG. 5 as would be seen from the perspective of Slice A. This may be understood as a view of the resources allocated to Slice A 150 across the illustrated network segment. From within Slice A 150, only the portions of the resources that have been allocated to Slice A 150 are visible. Thus, instead of being able to see the full capacity and capability of Resource 1 132, the capabilities and capacity of the portion allocated to Slice A 132A is available. Similarly, instead of being able to see the capacity and capabilities of Resource 2 136, only the capabilities and capacity of the portion allocated to Slice A 136A are available. Because nothing from Resource 3 142 had been allocated to Slice A 150, Resource 3 142 is not present within the topology of Slice A 150. All of the capacity and capability of Resource 4 146 was allocated to Slice A 146, and as such is present within Slice A 150. Slice A 132A of Resource 1 132 is connected to Slice A 136A of Resource 2 136 by logical link 152. Logical Link 152 may correspond to the portion of connectivity resource 134 allocated to Slice A 134A. Slice A 136A is connected to logical link 154 (representative of the portion of connectivity resource 138 allocated to Slice A 150), and is connected to Slice A 146A by logical link 156. Logical link 156 is representative of the portions of connectivity resource 140 and connectivity resource 144 that have been allocated to Slice A (portions 140A and 144A respectively). It should be understood that due to the absence of Resource 3 142 from Slice A 150, any traffic transmitted by Slice A 136A onto Connectivity Resource 140A will be delivered to Resource 4 146, and similarly any traffic transmitted from Slice 146A into Connectivity Resource 144A will be delivered to Slice A 136A. As such, within Slice A 150 Connectivity Resources 140A and 144A can be modelled as a single logical link 156. Logical link 158 is representative of the portion of Connectivity Resource 148 allocated to slice A 148A.

It should be understood that within the storage and computer resources illustrated in FIGS. 5 and 6, NFs can be instantiated using any of a number of known techniques, including network function virtualization (NFV), to create Virtual Network Functions (VNFs). While conventional telecommunications networks, including so-called Third Generation and Fourth Generation (3G/4G) networks, can be implemented using virtualized functions in their CNs, next generation networks, including so-called Fifth Generation (5G) networks, are expected to use NFV and other related technologies as fundamental building blocks in the design of a new CN and RAN. By using NFV, and technologies such as Software-Defined Networking (SDN), functions in a CN can be instantiated at a location in the network that is determined based on the needs of the network. It should be understood that if a network slice is created, the allocation of resources at different data centers allows for the instantiation of a function at or near a particular geographic location, even within the slice where resources have been abstracted. This allows virtualized functions to be "close" in a physical sense to the location at which they are used. This may be useful, and may combined with a sense of topological closeness to select a logical location at which to instantiate a function so that it is geographically or topologically close to a selected physical or network location.

Figure 7:
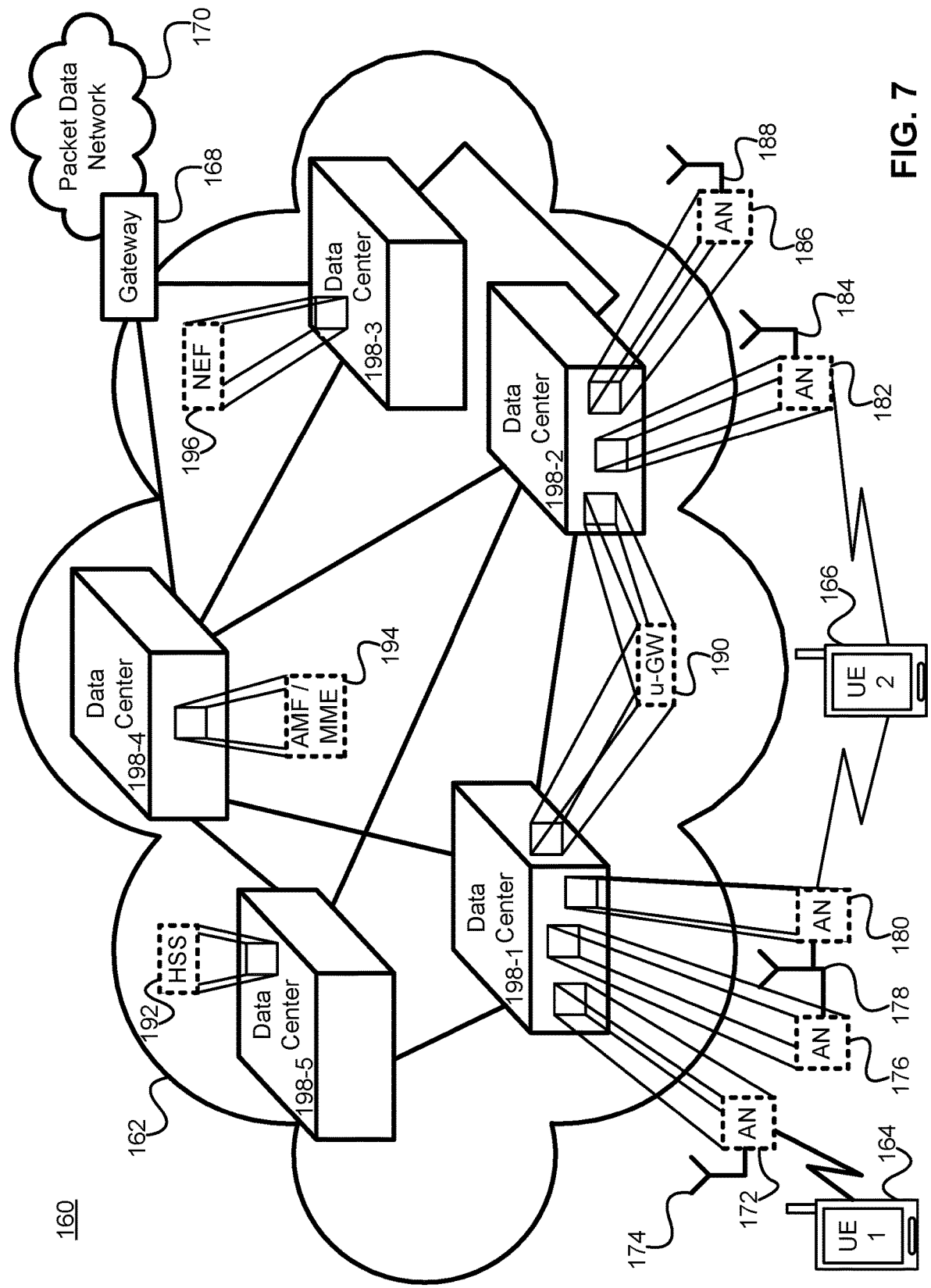
FIG. 7 is a diagram illustrating a cloud-based implementation of a Core Network and Radio Access Network using virtualized functions.

FIG. 7 illustrates a system 160 in which a core/RAN network 162 provides radio access and CN services to EDs 52 such as UE1 164 and UE2 166. In this figure, NFs are instantiated upon the underlying resources of a data center. The functions are shown as being exploded out of the pool of resources upon which they are instantiated. This is done to indicate that the functions act as independent entities and from a logical perspective they are indistinguishable from a physical node carrying out the same function. It should also be understood that in a sliced network where data centers provide the underlying resources upon which the slices are created, it is possible for a single network to have slices that support different versions of networks, so for example, in addition to having a virtualized network to support 5G traffic, a separate network slice can be created to support 4G networks. Traffic from EDs 52 can be routed through NFs, to a GW 168 that provide access to a packet data network 170 such as the Internet. Radio access services are typically provided by a RAN, which in this illustration is provided as a Cloud-RAN (C-RAN). Where a conventional RAN architecture was designed to be composed of discrete elements such as eNBs that were connected to the CN through a backhaul network, a C-RAN takes advantage of function virtualization to virtualize the Access Nodes (ANs) of the network. Much as a physical AN, such as an eNB, was connected to an antenna by a front haul link, in the illustrated embodiment of a C-RAN, ANs, such as a gNB are connected to an antenna (or to a remote radio head (RRH)) through a front haul connection, but are functions that are instantiated upon computer resources in network 162. If a gNB is divided into a CU and a plurality DUs, the virtualized DUs may in some embodiments be instantiated at or near the location of the antenna or RRH, while a CU may be instantiated at a data center to connect and serve a plurality of geographically dispersed DUs. For example UE1 164 is connected to the network through AN 172, which can provide radio access services through antenna 174. AN 172 is instantiated upon the compute and storage resources provided by a data center, in this case data center 198-1. Similarly AN 176 and AN 180, which are connected to the same set of antennae 178, are also instantiated upon the resources of data center 198-1. AN 180 provides radio access services to UE2 166, which also makes use of the access services provided by AN 182. AN 182 is connected to antenna 184, and is instantiated upon the resources of data center 198-2. AN 186 is connected to antenna 188, and is also instantiated upon the resources of data center 198-2. It should be understood that the front haul connections linking the virtualized ANs to the antennas or RRHs, may be direct connections, or they may form a front haul network. The integration of a C-RAN into a CN may obviate or reduce the concerns associated with backhaul connections as the AN functions may be co-located with CN functions. As such, data center 198-1 also serves as a location at which a user-specific GW function (u-GW) 190 is instantiated. This function is also instantiated in data center 198-2. Having a function instantiated at more than one data center may be part of a function migration processing which the function is moved through the network 162, or one of the instantiations may be an intentionally redundant instantiation. Both functions can be instantiated and configured, with only one of them active at a time, or they may both be active, but only one of them may be transmitting data to the UE. In other embodiments, such as those focussed on Ultra-Reliable connections, such as Ultra-Reliable Low Latency Communications (URLLC), both functions may be active and transmitting data to (or receiving data from) an ED such as UE2 166. NFs such as a HSS 192, an AMF 194, or its predecessor Mobility Management Entity (MME), and a NEF 196 are shown as being instantiated on the resources of data center 198-5, 198-4 and 198-3 respectively.

The virtualization of the NFs allows a function to be located in the network 162 at a location topologically close to the demand for the service provided by the function. Thus, AN 172, which is associated with antenna 174, can be instantiated upon data center resources at the data center closest to the antenna 174, in this case data center 198-1. Functions such as an NEF 196, which may not need to be close to ANs, may be instantiated further away (in either or both of a topological or physical sense). Thus, NEF 196 is instantiated at data center 198-3, and the HSS 192 and AMF 194 are instantiated at data centers 198-5 and 198-4 respectively, which are topologically closer to the radio edge of the network 162. In some network implementations, data centers can be arranged hierarchically and different functions can be placed a different levels in the hierarchy.

Figure 8:
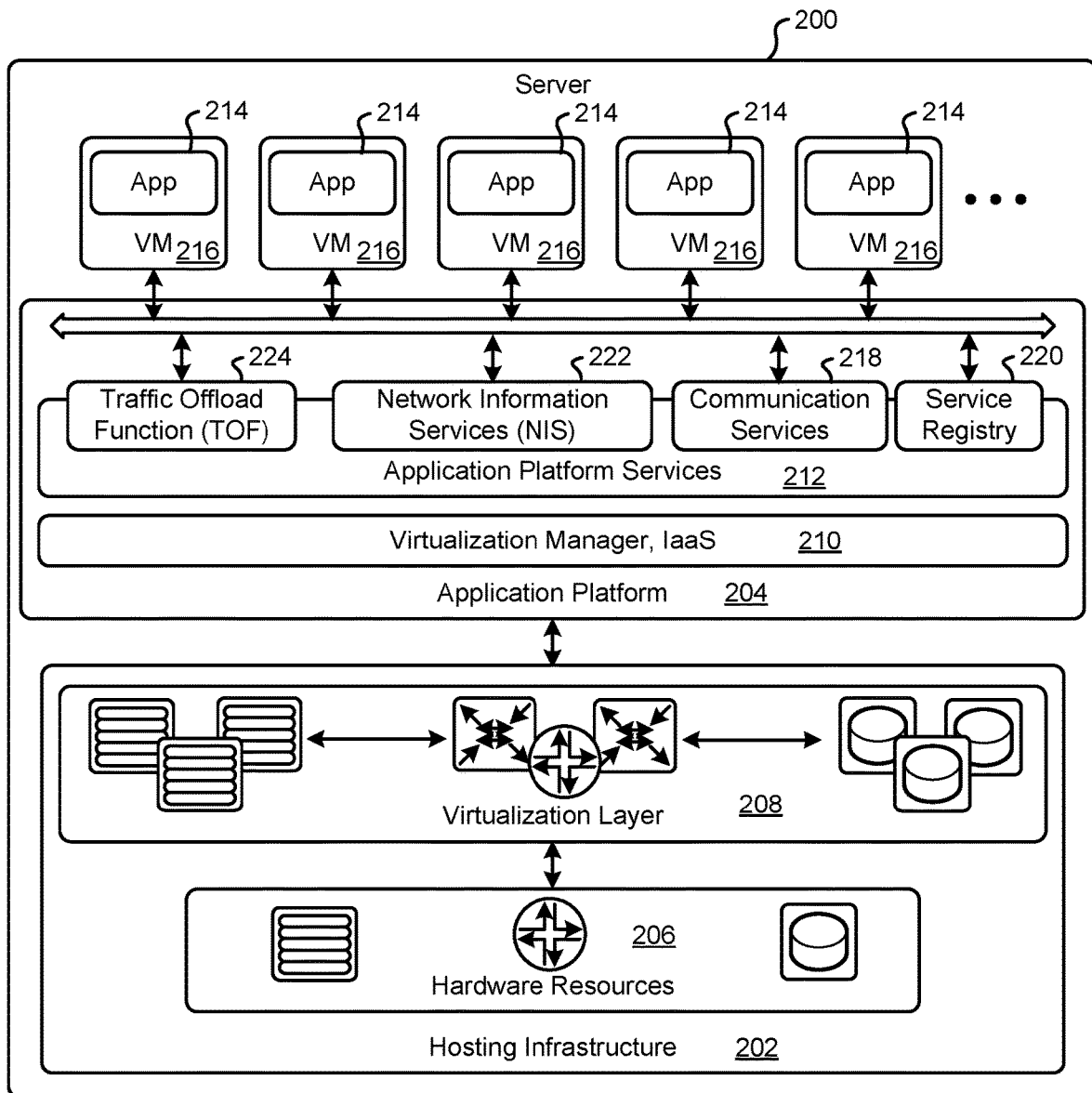
FIG. 8 is a block diagram illustrating a logical platform under which an ED can provide virtualization services.

FIG. 8 is a block diagram schematically illustrating an architecture of a representative server 200 useable in embodiments of the present disclosure. It is contemplated that the server 200 may be physically implemented as one or more computers, storage devices and routers (any or all of which may be constructed in accordance with the system 50 described above with reference to FIG. 1) interconnected together to form a local network or cluster, and executing suitable software to perform its intended functions. Those of ordinary skill will recognize that there are many suitable combinations of hardware and software that may be used for the purposes of the present disclosure, which are either known in the art or may be developed in the future. For this reason, a figure showing the physical server hardware is not included in this specification. Rather, the block diagram of FIG. 8 shows a representative functional architecture of a server 200, it being understood that this functional architecture may be implemented using any suitable combination of hardware and software. It will also be understood that server 200 may itself be a virtualized entity. Because a virtualized entity has the same properties as a physical entity from the perspective of another node, both virtualized and physical computing platforms may serve as the underlying resource upon which virtualized functions are instantiated.

As may be seen in FIG. 8, the illustrated server 200 generally comprises a hosting infrastructure 202 and an application platform 204. The hosting infrastructure 202 comprises the physical hardware resources 206, such as, for example, information processing, traffic forwarding and data storage resources) of the server 200, and virtualization layer 208 that presents an abstraction of the hardware resources 206 to the application platform 204. The specific details of this abstraction will depend on the requirements of the applications being hosted by the application layer (described below). Thus, for example, an application that provides traffic forwarding functions may be presented with an abstraction of the hardware resources 206 that simplifies the implementation of traffic forwarding policies in one or more routers. Similarly, an application that provides data stage functions may be presented with an abstraction of the hardware resources 206 that facilitates the storage and retrieval of data (for example using Lightweight Directory Access Protocol—LDAP).

The application platform 204 provides the capabilities for hosting applications and includes a virtualization manager 210 and application platform services 212. The virtualization manager 210 supports a flexible and efficient multi-tenancy run-time and hosting environment for applications 214 by providing Infrastructure as a Service (Iaas) facilities. In operation, the virtualization manager 210 may provide a security and resource "sandbox" for each application 214 being hosted by the platform 204. Each "sandbox" may be implemented as a Virtual Machine (VM) image 216 that may include an appropriate operating system and controlled access to (virtualized) hardware resources 206 of the server 200. The application-platform services 212 provide a set of middleware application services and infrastructure services to the applications 214 hosted on the application platform 204, as will be described in greater detail below.

Applications 214 from vendors, service providers, and third-paries may be deployed and executed with a respective VM 216. For example, MANagement and Orchestration (MANO) functions and Service Oriented Network Auto-Creation (SONAC) functions (or any of SDN, Software-Defined Topology (SDT), Software-Defined Protocol (SDP) and Software-Defined Resource Allocation (SDRA) controllers that may in some embodiments be incorporated into a SONAC controller) may be implemented by means of one or more applications 214 hosted on the application platform 204 as described above. Communication between applications 214 and services in the server 200 may conveniently be designed according to the principles of Service-Oriented Architecture (SOA) known in the art.

Communication services 218 may allow applications 214 hosted on a single server 200 to communicate with the application platform services 212 (through pre-defined Application Programming Interfaces (APIs) for example) and with each other (for example through a service-specific API).

A service registry 220 may provide visibility of the services available on the server 200. In addition, the service registry 220 may present service availability (eg. status of the service) together with the related interfaces and versions. This may be used by applications 214 to discover and locate the end-points for the services they require, and to publish their own service end-point for other applications 214 to use.

Mobile-edge Computing allows cloud application services to be hosted alongside virtualized mobile network elements in data centers that are used for supporting the processing requirements of the C-RAN. Network Information Services (NIS) 222 may provide applications 214 with low-level network information. For example, the information provided by NIS 222 may be used by an application 214 to calculate and present high-level and meaningful data such as: cell-ID, location of the subscriber, cell load and throughput guidance.

A Traffic Off-Load function (TOF) service 224 may prioritize traffic, and route selected, policy-based, user-data streams to and from applications 214. The TOF service 224 may be supplied to applications 214 in various ways, including: a pass-through mode where (either or both of uplink and downlink) traffic is passed to an application 214, which can monitor, modify or shape it and then send it back to the original Packet Data Network (PDN) connection (eg. a 3GPP bearer); and an End-point mode where the traffic is terminated by the application 214 that acts as a server.

The virtualization of NFs is considered to be a foundational technology for the architecture of flexible 5G networks. Function virtualization is a technology that allows for the creation of virtual functions on a base of compute, memory (which may include both executable memory and general storage) and connectivity or network resources. In many cases, these resources will exist within a data center. It should be understood that this discussion refers to resources instead of actual hardware because it is possible for virtualized resources to serve as the underlying resources for a next level of virtualization.

Virtualization may take the form of instantiating a virtual machine (VM) 216 that, to another entity on a network and to software executed on the VM 216, is no different than a physical node in the network. A VM 216 has its own set of compute, memory and network resources, upon which an operating system can be executed. The VM 216 can have a virtual network interface that can be assigned a network address. Between the underlying resources and the VM 216, there is typically a hypervisor that manages the resource isolation and network interactions. One of the purposes of a VM 216 is to provide isolation from other processes run on the system. When initially developed, a VM 216 was a mechanism to allow different network processors to operate without concern that a single errant process would be able to cause a complete system crash. Instead, an errant process would be contained to its own VM 216. This isolation allows for each VM 216 to have its own set of network interfaces. Typically, a single underlying resource can support a plurality of virtualized entities.

A more recent development has been the use of containers in place of VMs 216. Each VM 216 typically includes its own operating system which typically increases redundant resource usage. Containers allow a single OS kernel to support a number of isolated virtual functions. In place of a hypervisor that allows each VM 216 to run its own OS, a single OS hosts containers that are responsible for enforcing the resource isolation that would otherwise be provided by the VM 216. Each virtualized function within in its own container can be provided a virtualized network interface so that it appears as its own network entity.

Figure 9:
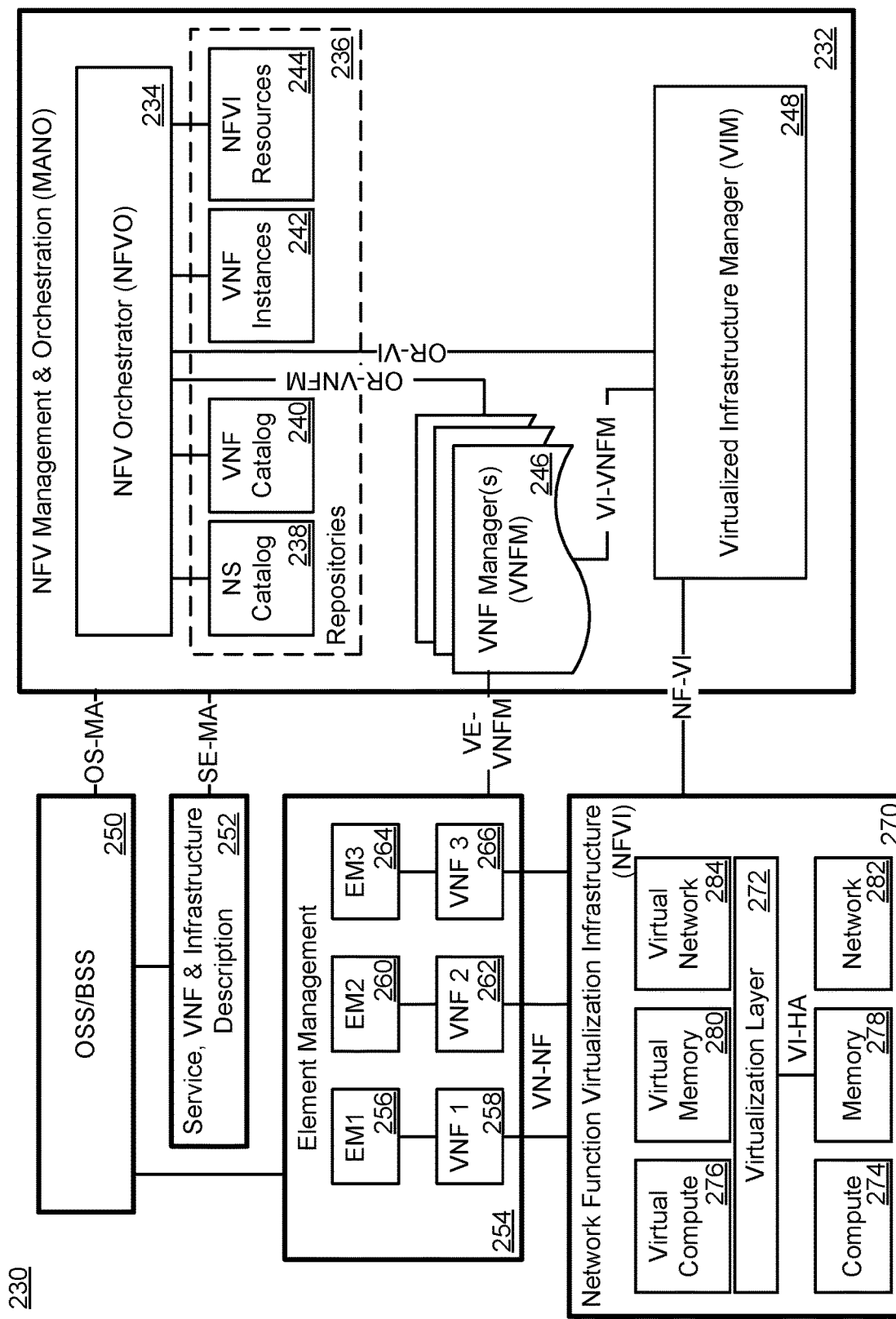
FIG. 9 is a block diagram illustrating an ETSI NFV MANO-compliant management and orchestration service.

With virtualization used in a networked environment, a question arises as to how the management of the instantiation, modification, and tear-down of virtualized functions is managed or orchestrated. To address this concern, the European Telecommunications Standards Institute (ETSI) has developed a set of standards for Network Function Virtualization (NFV) MANagement and Orchestration (MANO). As illustrated in FIG. 9, the NFV-MANO system allows for the management of NFV instantiation and modification. As illustrated, there can be interfaces to existing systems such as the Operation Support System (OSS)/Business Support Subsystem (BSS) 250. In network architecture 230, an NFV-MANO system 232 includes an orchestrator 234 which can access libraries 236 such as Network Service catalog 238, VNF Catalog 240, VNF Instances repository 242 and NFVI resources repository 244. The NS Catalog 238 may include templates that can be used as the basis for supporting network services. VNF catalog 240 may contain templates for the instantiation of different classes of VNFs. A particular VNF, after being instantiated, may be referred to as a VNF instance, and its attributes may be stored in VNF instances repository 242. NFVI resources 244 may be used to track the availability of resources, including both virtual resources and the physical infrastructure upon which they are instantiated. The NFVO 234 can be connected to a number of VNF Managers 246 through an OR-VNFM interface, and to a Virtualized Infrastructure Manager (VIM) 248 through a OR-VI interface. The VNFM 246 and VIM 248 can be connected to each other through a VI-VNFM interface.

The NFV MANO 232 can communicate with an OSS/a system 250 through OS-MA interface, and to a Service, VNF & Infrastructure description database 252 through an SE-MA interface. The Service, VNF & Infrastructure description database 252 can contain operator information about the services, VNFs and infrastructure deployed in the network. Service, VNF & Infrastructure description database 252 and OSS/BSS 250 can be connected to each other so that the OSS/BSS 250 can update and maintain the Service, VNF & Infrastructure description database 252 as needed.

NFVI 270 interacts with the VIM 28 through the NF-VI interface. Underlying resources can often be classified as compute resources 274, memory resources 278 and network resources 282. Memory resources 278 may also be referred to as storage resources, while network resources 282 may also be referred to as connectivity resources. A virtualization layer 272 allows for the abstraction of the underlying resources that it is connected to through a VI-HA interface. It should be understood that the underlying resources may be either physical or virtual resources. The Virtualization layer 272 allows for the abstraction of the underlying resources into virtual compute resources 276, virtual memory resources 280 and virtual network resources 284. These virtualized resources can be provided to the element management system 254 through the VN-NF interface so that they can be used as the resources upon which the VNFs (shown as VNF1 258, VNF2 262 and VNF3 266) can be instantiated. An element manager (EM) 254 can be connected to the VNFM 246 within NFV MANO 232 through interface VE-VNFM, and to the OSS/BSS 250 through another interface. Each VNF instantiated upon the virtual resources provided by NFVI 270 can be associated with an EM (EM1 256, EM2 260 and EM3 264). The use of an EM allows the OSS/BSS 250 to have two paths through which the VNFs can be managed. A VNF can be managed through the VNFM 246, or through the EM associated with the VNF. Each EM can provide the same management controls that it would otherwise provide for a physical network element. Thus, the OSS/BSS 250 can treat each VNF as a conventional NF. Modification to the resource allocation associated with a VNF can be requested by an EM through the VNFM 246, or through a request from the OSS/BSS 250 over the OS-MA interface.

The virtualization of NFs allows functions to be deployed with the resources that are required and not with an intentional over provisioning. In conjunction with the above-described slicing and data center utilization, flexible networks can be deployed in a manner that allows an operator to dynamically modify the connectivity between functions (thus changing the logical topology of the network) and to dynamically modify the resources and location of the NFs (thus changing the physical topology of the underlying network). Additional resources can be allocated to existing functions to allow for scaling-up of an existing function, and resources can be removed from an allocation to allow for a scaling-down of a function. Resources from more than one resource pool or data center can be allocated to a function so that it can be scaled-out, and resources from different pools can be removed to allow a function to be scaled-in. Functions can be moved by transferring their state information to another NF, and in some instances, a function can be moved through a combination of scaling-out and scaling-in functions.

Figure 10:
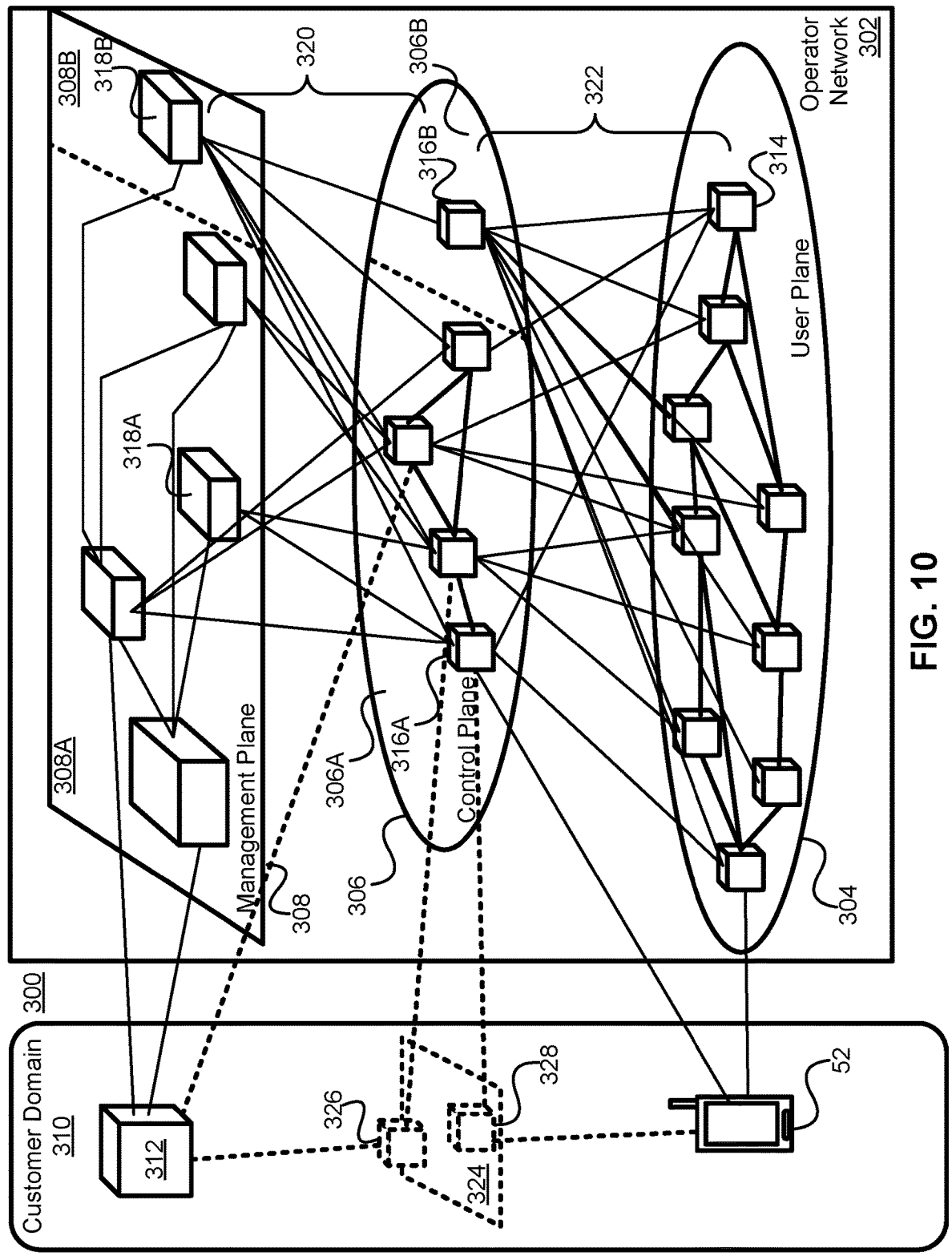
FIG. 10 is a diagram illustrating an embodiment of interactions between the Management Plane, Control Plane and User Plane of a network.

FIG. 10 illustrates a network architecture 300 in which the resources of the operator network 302 are divided into a set of logical planes, a UP 304, a CP 360 and a Management Plane (MP) 308 The UP 304 is typically focussed on packet transport, but certain functions including packet filtering and traffic shaping can be performed in the UP 304, although this is typically performed based on instructions from a NF in the CP 306. Functions in the MP 308 receive input from NFs within the customer domain 310 about the policies that should be enforced by the network control functions in the CP 306. If Operator Network 302 supports network slicing, functions within MP 308 may be responsible for slice design and creation. It should be understood that a single MP 308 may be used to provide management functionality for a plurality of network slices that each have different control and user planes. Functions within the MP 308 can communicate with each other to ensure that the differing policies for a possible plurality of customers are fitted together in a suitable set of instructions.

UP 304 may also be referred to as a data plane (DP). It carries the traffic between an ED 52 and other external data networks (not shown) or functions within the operator network 302. UP 304 is typically composed of UP Functions (UPFs) 314. In some instances, a UPF 314 may be specific to a particular UE, it may be specific to a particular service (in some embodiments, it may be both user and service specific), and in other instances it may be a generic function serving a plurality of users and services. UPFs 314 are connected to each other to allow for DP traffic to be transmitted.

The CP 306 may be composed of CP Functions (CPFs) 316. In a 3GPP compliant network, some CPFs 316A have functions defined by standards, while other CPFS 316B may be outside the specification of the relevant standards. This may effectively result in the CP 306 being divided into a standards-compliant CP segment 306A and a non-standards compliant CP segment 306B. In a 3GPP-compliant CP segment 306A, NFs 316A such as an AMF, SMF, NEF, AUSF, etc. may be present, and in some embodiments more than one instance of any or all of the functions may be present. In a non-standards compliant CP segment 308B, a NF 316B such as an SDN Controller, or other such controllers including a SONAC-OPS controller, may be connected to other CPFs, as shown by functions 316A, but this is not necessarily required as may be seen by CPF 316B. ED 52 may also communicate with CPFs.

The Management Plane 308 can be divided between a standards-compliant section 308A and a non-standards compliant section 308B, much as CP 306 is divided. Within MP 308, NFs and nodes 318 can communicate with each other, and with a NF or node 312 within the customer domain 310. MP entities 318A (within the standardized section 308A) and 318B (within the non-standards compliant section 308B) can be used to establish policy, and the mechanisms by which policy is to be enforced, based on the resources available and requirements received from the customer 312 (and possibly a plurality of different customers). Network Management Functions (NFMs) 318 may be responsible for accounting and billing functions for element management, they may provide the services required for an OSS and a BSS. Outside the standardized functions, non-standardized NFs 318B may include an NFV-MANO system and a SONAC-Com controller.

NMFs 318 can receive external input from a customer node 312, and can communicate with each other. NMFs 318 can also communicate, over any of the MP-CP connections 320, with CPFs 316 to provide instructions about the policies to be enforced by CPFs 316. Changes in the resources underlying the network 302 are also communicated by a NFM 318 to CPFs 316. In CP 306, CPFs communicate with each other, and with ED 52. CPFs 316 are also in communication with UPFs 314, and through this communication they can receive information such as traffic loads on links and processing loads at NFs. In conjunction with policy information received from NMFs 318, a CPF 316 can transmit instructions to the UPFs 314, over the CP-UP (also referred to as UP-CP) connections 322, to govern the behaviour of the UPFs 314. A UPF 314 receives configuration information from a CPF 318, and handles UP traffic in accordance with the received configuration information. Loading information (which may include both processing and network connection (or link) loading) may be gathered by a UPF 314 and provided to a CPF 316.

In some embodiments, the customer NF 312 may have a connection to a CPF 316. This CPF 316 with which customer NF 312 communicates, may be either a 3GPP-compliant CPF 316A or a non-3GPP compliant CPF 316B. In alternate embodiments, the customer NF 312 may make use of a function within MP 308 to relay messages to functions in CP 306. Within the customer domain 310, there may be an optional CP 324, with customer CPFs 326 and 328. When such a customer CP 324 is present, functions 326 and 328 may have logical communications links with either or both of ED 52 and the customer NF 312. Customer CP functions 326 and 328 may have connections to functions within CP 306 (either 3GPP-compliant functions 316A or non-3GPP compliant functions 316B).

A shareable NSI of the present disclosure can be created for a first VN service or for a plurality of VN services. If at a later point, one or more additional VN services are requested, if appropriate, some or all of these additional VN services may be added to the existing shareable NSI without terminating the existing NSI and creating a new NSI with expanded capabilities as would be the case if the NSI was dedicated to a single VN service, as in the case of FIG. 11.

The shareable NSI thus presents multiplexing gains to the MNO through the ability to support a plurality of the same or similar types of VN services through a common shared NSI.

Figure 12:
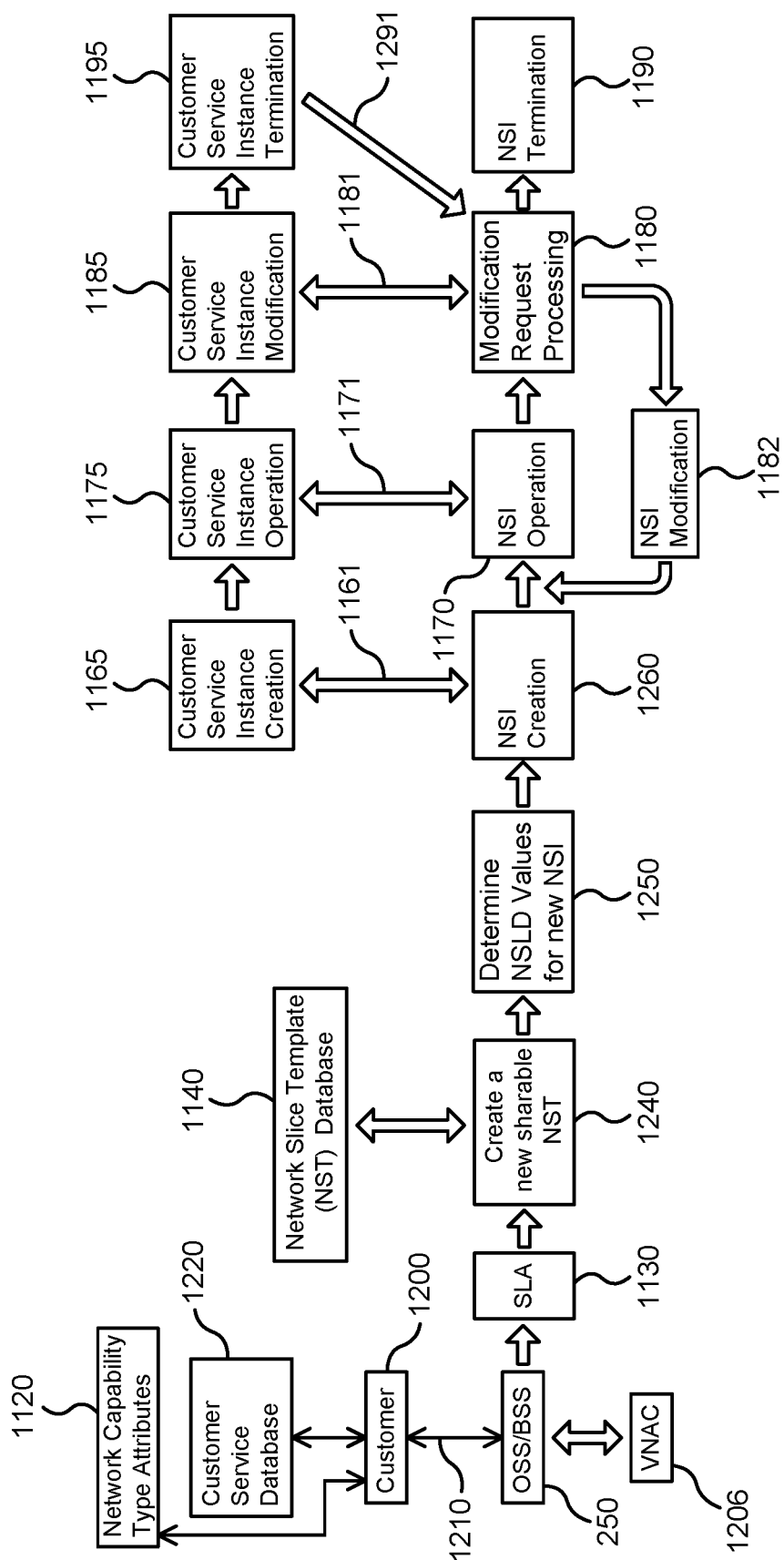
FIG. 12 is a block diagram showing an example of the life cycle of a newly-created shareable NSI according to an example embodiment.

FIG. 12 shows the life cycle of a shareable NSI from its creation to termination.

Figure 11:
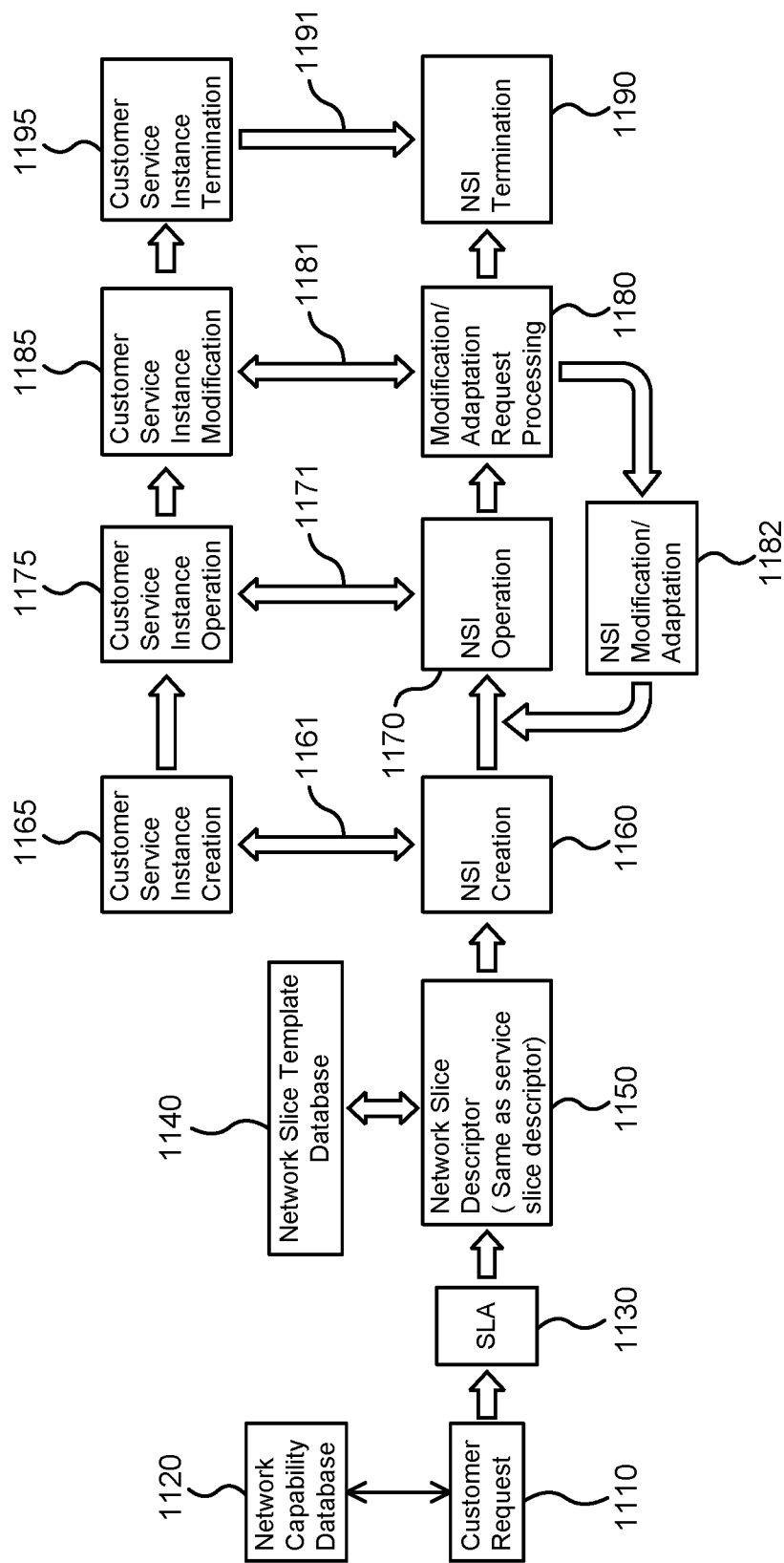
FIG. 11 is a block diagram showing an example of the life cycle of an NSI that is created exclusively for a VN service.

As with FIG. 11, the process starts with one or more customer requests for one or more VN services. Because more than one customer may be involved and each customer may request more than one VN service, the customer request may be a little more involved. It will be appreciated that the same or a similar structure may be in place in the case of FIG. 11, but such structure was simplified for purposes of illustration.

In the example of FIG. 12, the customer 1200 may again be provided with access to the network capability database 1120 of the MNO.

Additionally or in the alternative, the customer 1200 may be provided with access to a CSI database 1220 that identifies CSIs with which the MNO is familiar, against the possibility that one such CSI could match to some extent the customer's desired VN service and thus form the basis of the customer request 1210. If so, this may be an indication to the MNO that it may be appropriate, as discussed below in the case of FIG. 13, of adding the customer's requested VN service to an existing shareable NSI that is already instantiated to support the CSI with which the customer's VN service is a match.

By way of non-limiting example, the VN service may relate to the provision of videoconference services. Such VN service requests may be expected by an MNO to arrive at the VNO from time to time from different customers and can be accommodated in a single shareable NSI.

The customer 1200 sends the customer request 1210 to an OSS/BSS 250 for handling. The OSS comprises software and occasionally hardware application that support back-office activities that operate the VNO's network and provision and maintain customer services. The BSS comprises software application(s) that support customer-facing activities including without limitation billing, order management, customer relationship management, call centre automation and may encompass the customer-facing veneer of OSS applications such as trouble-ticketing and service assurance. The OSS/BSS 250 negotiates with the customer 1200 until the customer request 1210 is formalized into an SLA 1130. In some cases, the OSS/BSS 250 access a virtual network admission control (VNAC) module in the course of such negotiation.

As will be discussed in connection with FIG. 13, the MNO first checks to see if an existing shareable NSI may be suitable to service the VN service described in the SLA 1130. For the sake of the present discussion, it is assumed that no such existing NSI is identified so that a new shareable NSI will be created.

The shareable NSI may be created from a shareable NST. If a suitable existing shareable NST is found in the NST database 1140, it may be selected 1240. Otherwise a new shareable NST is created 1240 and may be added to the NST database 1140.

The shareable NST will specify monitoring constraints for all shared components.

Further, the shareable NST will specify work flows for adding a VN service, for modifying an existing VN service and/or for terminating an existing VN service.

The shareable NST may also specify whether dynamic or static resource control will be employed for each VN service within the NSI. Dynamic resource control may be appropriate to obtain multiplexing gain. In some cases, the shareable NST may specify resource usage only for certain network components or functions. If resource usage is not specified for a component or function, it can be used if available.

In some cases, the SLA 1130 may allow the VNO not to control the resource usage of the VN services sharing the NSI. This may occur, by way of non-limiting example, when all the VN services are for a common customer who is indifferent how the VN services use the resources. A customer may be indifferent to resource usage, by way of non-limiting example, when the customer has awareness of its traffic profiles and/or has some mechanism to control traffic. Even so, the customer may nevertheless demand that the performance and resource usage of each VN service to be monitored separately.

In some cases, the SLA 1130 may not have strict performance constraints. By way of non-limiting example, the SLA 1130 may simply specify "best efforts traffic". In such cases, the VNO may not control the resource usage of the VN services sharing the NSI. In addition, or in the alternative the control plan may control and/or monitor resource usage for each VN service sharing the NSI.

It is expected that the VN services that will share a shareable NSI will typically have similar function chains in common, with common QoS demands. In such case, the shareable NST may specify only one set of flows for such common function chains. A parameter may be introduced corresponding to the number of shared services in the NSI. Resource usage thresholds and/or capability assignment parameters may be specified for each VN service sharing the shareable NSI.

However, it is conceivable that the VN services are not identical, so that each may have function chains that are different from one or more of the other VN service sharing the shareable NSI. To the extent that there are different function chains, these should be specified in the shareable NST.

Furthermore, if the QoS demands are different for the different VN services sharing the shareable NSI, even for common function chains, the shareable NST may specify separate flow descriptions, each with a corresponding QoS demand. In some cases, the QoS demand may be specified as a parameter or percentage of the aggregate capability supported by the NSI.

Parameters may also be used for different service capabilities beside QoS. In some cases, a vector of such parameters may be created in which each member of the vector represents one of the VN services.

As with FIG. 11, the values of the NSD 1150 corresponding to the shareable NST may be determined 1250. While similar to the processing performed in the case of an exclusive NSI shown in FIG. 11, there are some differences.

First, the NSD 1150 will maintain separate CSI descriptions for each VN service.

Second, the NSD 1150 will manage triggers for performance- or fault-related events separately for each VN service.

Third, the NSD 1150 will specify different parameter value sets for each VN service.

Fourth, as indicated above, some of the function chains will be common to the VN services sharing the shareable NSI. However, the demands imposed by each VN service on the functions may be different. Accordingly, the NSD 1150 may specify different resource allocations for each VN service. This may be especially the case if the function chains are associated with different geographic regions.

Thereafter, in a manner largely similar to the scenario in FIG. 11, the shareable NSI can be created 1260 and the corresponding NFs and resources configured and allocated, and the CSI can be created 1165.

Once the shareable NSI has been created 1260, it can enter the operational mode 1170 unless and until the shareable NSI processes a request to modify the shareable NSI 1180, in which case the NSI modification function 1182 is invoked, whereby the configuration of the shareable NSI is altered before the operational mode 1170 is resumed.

However, the processing when the VN service is terminated differs from the scenario of FIG. 11, because the NSI is not exclusive to the terminating VN service, but may be associated with other VN services that are not terminating. Accordingly, if the CSI communicates termination 1291, this is processed by the shareable NSI as a request to modify the shareable NSI 1180. If the terminating VN service is the only VN service, the shareable NSI is terminated 1190. Otherwise, the NSI modification function 1182 is invoked to remove the terminating VN service and return the modified shareable NSI, absent the terminating VN service, to the operational mode 1170.

Figure 13:
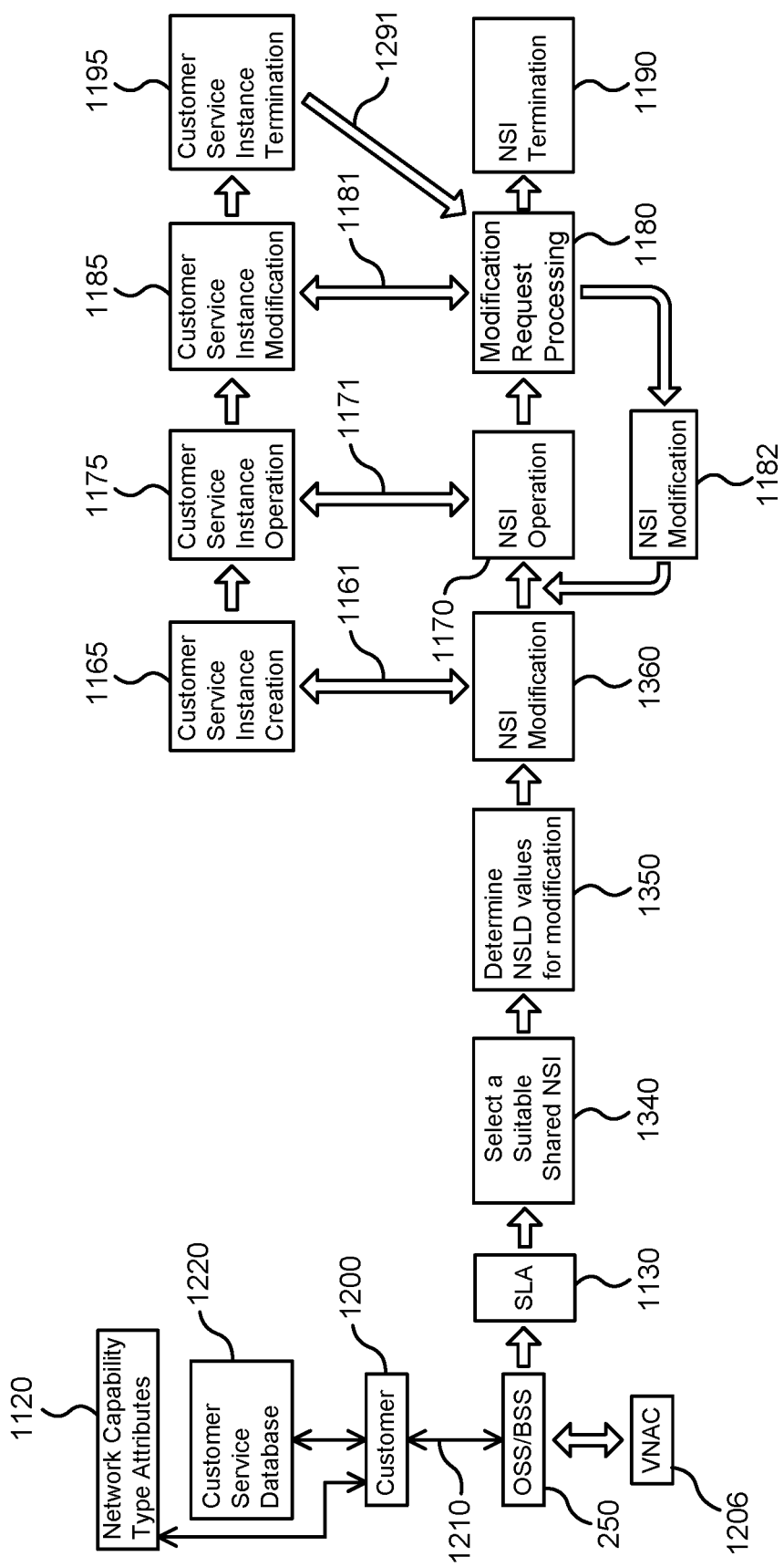
FIG. 13 is a block diagram showing an example of the addition of a new VN service to the shareable NSI of FIG. 12 that has already been created.

FIG. 13 shows how a new VN service, which may be associated with the same or a different customer, can be added to the existing shareable NSI created in the context of FIG. 12.

As with FIG. 12, the customer 1200 may again be provided with access to the network capability database 1120 of the MNO and/or the CSI database 1220. Assuming that the new VN service bears some similarity to the existing VN service(s) in the existing shareable NSI, it is likely that the customer requesting the new VN service will identify an existing CSI that corresponds to such existing VN service(s) and use it to form the basis of the customer request 1210. The customer 1200 sends the customer request 1210 to the OSS/BSS 250 and negotiations ensue resulting in a further SLA 1130.

Once again, the MNO checks to see if an existing shareable NSI may be suitable to service the VN service described in the further SLA 1130. For the sake of the present discussion, it is assumed that an existing NSI is identified.

Thus, rather than creating a new shareable NSI as in FIG. 12, the identified existing shareable NSI will be modified to include the new VN service described in the further SLA 1130, in addition to serving the already-included VN services.

In such a situation, the MNO assesses what changes are to be made to the existing shareable NSI to accommodate the new VN service 1350. Rather than creating a NSD (only one NSD is associated with an NSI, whether or not shareable) or modifying the existing NSD, a service instance descriptor (ISD) is created for the new VN service. The ISD identifies all of the resources and network components that will be called upon to support the new VN service, in a manner similar to the NSD for the shareable NSI and taking into account similar considerations as described for the NSD in the context of FIG. 12.

In some cases, the existing shareable NSI may be modified 1360 to increase resources, activate or configure components or functions associated with the existing shareable NSI.

Furthermore, process monitoring, such as performance and/or fault monitoring that are specific to the new VN service may be established to ensure that any KPI demands and/or any QoE demands for individual end users of the new VN service are satisfied. Such KPI and/or QoE demands may have been requested by the VNO, the customer requesting the new VN service or the network operator. It will be appreciated that if multiple domain infrastructure is employed, the process monitoring may involve interacting with different domains.

Once the shareable NSI has been modified 1360, it can resume the operational mode 1170 unless and until the shareable NSI processes a request to modify the shareable NSI 1180, in which case the NSI modification function 1182 is invoked, the configuration of the shareable NSI altered and the operational mode 1170 resumed.

As with FIG. 12, if the CSI corresponding to the new (or indeed any) VN service communicates termination 1291, this is processed by the shareable NSI as a request to modify the shareable NSI 1180. If the terminating VN service is the only VN service, the sharable NSI is terminated 1190. Otherwise, the NSI modification function 1182 is invoked to remove the terminating VN service and return the modified shareable NSI, absent the terminating VN service, to the operational mode 1170.

Method Actions

Figure 14:
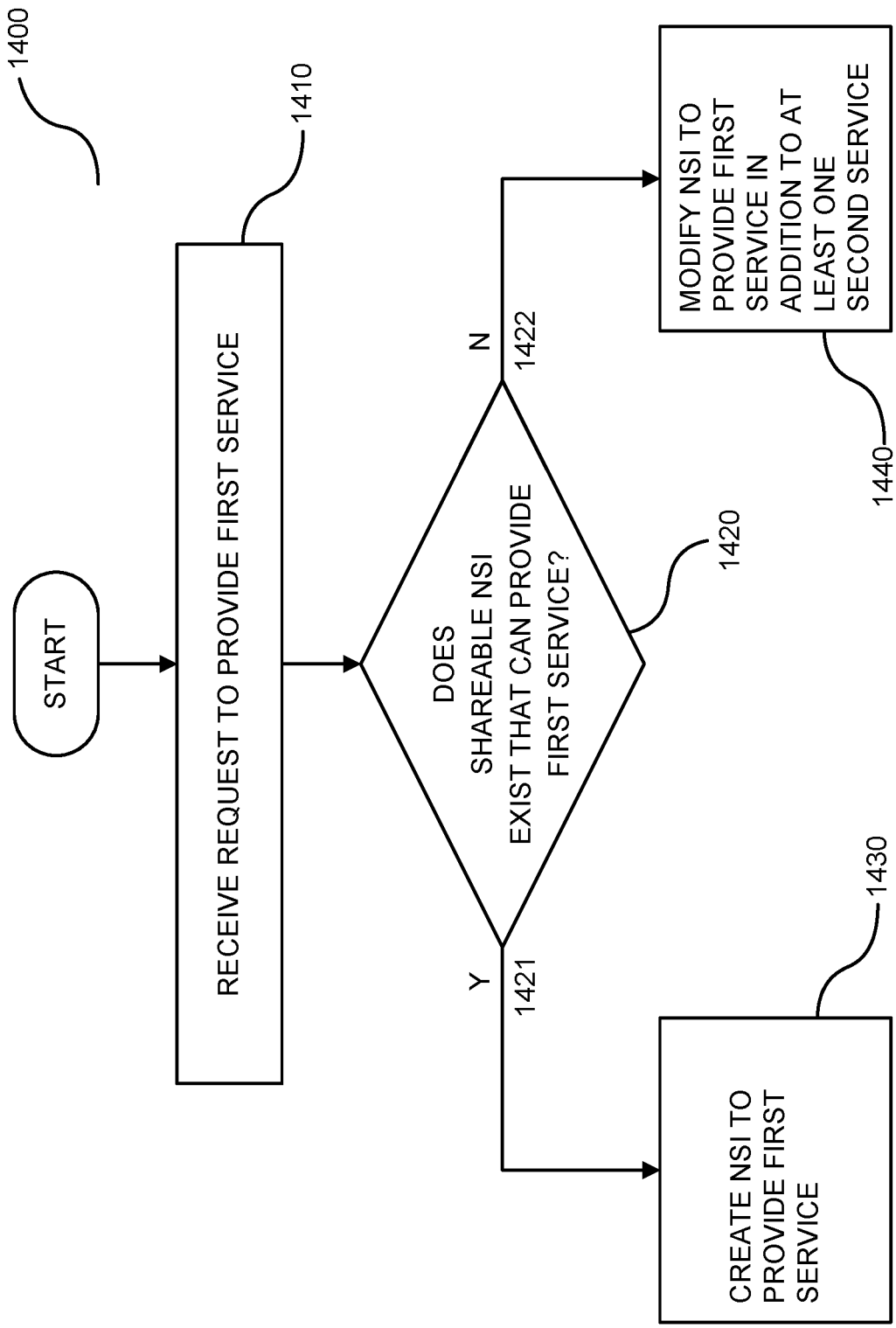
FIG. 14 is a flow chart illustrating an example of a method of providing a service in a telecommunications network.

Turning now to FIG. 14, there is shown a flow chart, shown generally at 1400, of example actions taken to provide a service in a telecommunication network comprising a plurality of resources and at least one slice of resources.

One example action 1410 is to receive a request to serve a group of user devices by a first service.

One example action 1420 is to create an NSI to provide the first service, if it is determined that there is no existing NSI shareable between a plurality of services, that can provide the first service.

One example action 1430 is to modify an existing NSI, shareable between a plurality of services, if it is determined that the existing NSI can provide the first service, to serve the group of user devices by that first service in addition to at least one second service that is already provided by the existing NSI.

Terminology

The terms "including" and "comprising" are used in an open-ended fashion, and thus should be interpreted to mean "including, but not limited to". The terms "example" and "exemplary" are used simply to identify instances for illustrative purposes and should not be interpreted as limiting the scope of the invention to the stated instances. In particular, the term "exemplary" should not be interpreted to denote or confer any laudatory, beneficial or other quality to the expression with which it is used, whether in terms of design, performance or otherwise.

The terms "couple" and "communicate" in any form are intended to mean either a direct connection or indirect connection through some interface, device, intermediate component or connection, whether optically, electrically, mechanically, chemically, or otherwise.

References in the singular form include the plural and vice versa, unless otherwise noted.

As used herein, relational terms, such as "first" and "second", and numbering devices such as "a", "b" and the like, may be used solely to distinguish one entity or element from another entity or element, without necessarily requiring or implying any physical or logical relationship or order between such entities or elements.

In an example, there is provided a method for providing a service in a telecommunications network comprising a plurality of resources and at least one slice of resources. The method comprises actions of receiving a request from a customer to provide a first service; determining if there is an existing NSI of the slice, the NSI being shareable between a plurality of services, that can provide the first service; creating a new NSI to provide the first service, if it is determined that there is no existing NSI that can provide the first service; and modifying the existing NSI, if it is determined that there is an existing NSI that can provide the first service, to provide the first service in addition to at least one second service.

The first service and the at least one second service can comprise a common chain of NFs. The first service and the at least one second service can be of substantially the same type. At least one of the second services can be provided to the customer.

The action of receiving can comprise negotiating with the customer for a service capability that will be provided in the first service. The action of negotiating can comprise specifying the negotiated service capability in a service level agreement.

The action of creating can comprise creating the NSI from an NST.

The action of determining can comprise selecting an NST in an NST database that is suitable to provide the first service. The action of determining can comprise identifying if there exists an NSI created from the NST database. The action of determining can comprise completing an NSD. The action of completing an NSD can comprise defining capabilities corresponding to the first service of at least one NF in a function chain specified in the NST. The action of defining can comprise defining a capability of the NF selected from a group consisting of admission control, capacity throughput, geography, resources and any combination of any of these. The action of defining can comprise defining a topology for the function chain.

The action of modifying can comprise completing an ISD. The action of completing the ISD can comprise taking into consideration an NS descriptor completed when the NSI was created. The action of completing the ISD can comprise defining capabilities corresponding to the first service of at least one NF in a function chain specified in an NST from which the NSI was created. The action of defining can comprise defining a capability of the NF selected from a group consisting of admission control, capacity, throughput, geography, resources and any combination of any of these.

The method can comprise an action of operating the NSI providing the first service. The action of operating can comprise monitoring KPIs of the network. The action of operating can comprise monitoring QoE of users of the customer. The action of operating can comprise performing an activity selected from a group consisting of end user authentication, traffic routing, traffic monitoring, accounting, charging and any combination of any of these.

The method can comprise receiving a modification request. The action of receiving a modification request can comprise modifying the NSI in accordance with the modification request. The action of modifying the NSI in accordance with the modification request can comprise operating the NSI after modifying it. The modification request can be received from an operator of the network. The modification request can be received from the customer. The modification request can comprise a request to terminate the first service. If the first service is the only service sharing the NSI, the action of receiving a modification request can comprise terminating the NSI. If the first service is not the only service sharing the NSI, the action of receiving a modification request can comprise modifying the NSI to remove the first service.

The slice can be allocated to provide each service with which the NSI is shared.

General

All statements herein reciting principles, aspects and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be appreciated that the present disclosure, which can be modified by omitting, adding or replacing elements with equivalent functional elements, provides many applicable inventive concepts that may be embodied in a wide variety of specific contexts. The specific embodiments discussed are merely illustrative of specific ways to make and use the concepts disclosed herein, and do not limit the scope of the present disclosure. Rather, the general principles set forth herein are considered to be merely illustrative of the scope of the present disclosure.

It will be apparent that various modifications and variations covering alternatives, modifications and equivalents will be apparent to persons having ordinary skill in the relevant art upon reference to this description and may be made to the embodiments disclosed herein, without departing from the present disclosure, as defined by the appended claims.

Accordingly the specification and the embodiments disclosed therein are to be considered examples only, with a true scope of the disclosure being disclosed by the following numbered claims:

What is claimed is:

1. A method for providing a service in a telecommunications network comprising a plurality of resources and at least one slice of resources, comprising:
    receiving a request to serve a group of user devices by a first service;
    creating a new network slice instance (NSI) to provide the first service, if it is determined that there is no existing NSI, shareable between a plurality of services, that can provide the first service; and
    modifying an existing NSI, shareable between a plurality of services, if it is determined that the existing NSI can provide the first service, to serve the group of user devices by that first service in addition to at least one second service that is already provided by the existing NSI;
    wherein creating comprises defining capabilities corresponding to the first service of at least one network function (NF) in a function chain specified in a network slice template (NST) from which the NSI was created.

2. The method of claim 1, wherein the first service and the second service comprise a common chain of network functions (NFs).

3. The method of claim 1, negotiating with a customer for a service capability that will be provided by the first service.

4. The method of claim 1, wherein defining comprises defining a capability selected from a group consisting of NF-related attributes, performance-related attributes, fault-related attributes, charging-related attributes, transport link-related attributes, isolation-related attributes, security-related attributes and any combination of any of these.

5. The method of claim 4, wherein the NF-related attributes are selected from a group consisting of admission control capacity, storage, latency, usage monitoring, throughput, location, geography, communication speed, scalability, admission of a new service, activation time, deactivation time, creation time, termination time, resources and any combination of any of these.

6. The method of claim 4, wherein the performance-related attributes are selected from a group consisting of overall capacity, quality of experience (QoE), network key performance indicators (KPI), individual end-user related performance and any combination of any of these.

7. The method of claim 4, wherein the transport link-related attributes are selected from a group consisting of link end points, link usage methods, capacity, quality of experience (QoE), quality of service (QoS) and any combination of any of these.

8. The method of claim 1, wherein defining comprises defining a topology for the function chain.

9. The method of claim 1, wherein modifying comprises defining capabilities corresponding to the first service of at least one network function (NF) in a function chain specified in a network slice template (NST) from which the NSI was created.

10. The method of claim 9, wherein the action of defining comprises defining a capability selected from a group consisting of NF-related attributes, performance-related attributes, fault-related attributes, charging-related attributes, transport link-related attributes, isolation-related attributes, security-related attributes and any combination of any of these.

11. The method of claim 10, wherein the NF-related attributes are selected from a group consisting of admission control, capacity, storage, latency, usage monitoring, throughput, location, geography, communication speed, scalability, admission of a new service, activation time, deactivation time, creation time, termination time, resources and any combination of any of these.

12. The method of claim 10, wherein the performance-related attributes are selected from a group consisting of overall capacity, quality of experience (QoE), network key performance indicators (KPI), individual end-user related performance and any combination of any of these.

13. The method of claim 10, wherein the transport link-related attributes are selected from a group consisting of link end points, link usage methods, capacity, quality of experience (QoE), quality of service (QoS) and any combination of any of these.

14. The method of claim 9, wherein defining comprises defining a topology for the function chain.

15. The method of claim 1, further comprising operating the NSI providing the first service.

16. The method of claim 15, wherein operating comprises monitoring a performance metric selected from a group consisting of a key performance indicator (KPI) of the network, quality of experience (QoE) of a service provided by the NSI and any combination of any of these.

17. The method of claim 15, wherein operating comprises performing an activity selected from a group consisting of end user authentication, traffic routing, traffic monitoring, accounting, charging and any combination of any of these.

18. The method of claim 15, further comprising receiving a request to terminate the first service, and if the first service is the only service sharing the new NSI, terminating the new NSI.

19. The method of claim 15, wherein, further comprising receiving a request to terminate the first service, and if the first service is not the only service sharing the existing NSI, modifying the existing NSI to remove the first service.

20. A method for providing a virtual network service in a virtual telecommunications network, the method comprising:
    receiving, at a mobile network operator (MNO), a customer request for a new virtual network service to serve a group of user devices of a customer, the customer request including a virtual network service capability that will be provided by the new virtual network service;
    in response to determining, at MNO, that there is no existing shareable network service instance (NSI) which supports a plurality of virtual network services and satisfies the virtual network service capability included in the customer request, creating, at MNO, a new NSI and allocating the new NSI to the customer to support the new virtual service; and
    in response to determining, at MNO, that there is an existing shareable NSI which supports a plurality of virtual network services and satisfies the virtual network service capability included in the customer request, modifying at MNO, the existing shareable NSI and allocating the existing shareable NSI to customer to support the new virtual network service to service the first service in additional to the plurality of virtual network services that the existing shareable NSI supports.

21. The method of claim 20, further comprising negotiating with the customer for the virtual network service capability that will be provided by the first service, and wherein the customer is one of: a corporate customer, a mobile virtual network operator (MVNO) and a vertical service provider.

22. The method of claim 20 further comprising receiving a modification request to terminate the first virtual network service, and when the first virtual network service is the only virtual network service provided by the new NSI; and terminating the new NSI.

23. The method of claim 20, further comprising a creating a service instance descriptor for the new virtual network service that identifies all network resources and network components that will be called upon to support the new VN service.

24. The method of claim 20, wherein modifying the existing shareable NSI comprises increasing resources of the existing shareable NSI, activating network components or network functions associated with the existing shareable NSI, or configuring network components or network functions associated with the existing shareable NSI.

25. The method of claim 20, wherein the customer request includes a service level agreement that specifies the virtual network service capability that will be provided by the new virtual network service, and wherein creating a new NSI comprises creating a new shareable NSI from a network service template that describes network function chains that will be instantiated to provide the service capability specified in the service level agreement.

26. The method of claim 20, wherein the service capability selected from a group consisting of:
 a mechanism for authenticating a user of one of the group of user devices,
 a demand expected an end user of the group of user devices,
 a relative priority assigned to a plurality of a function and processing of the service,
 a technique to control overloading,
 a performance monitoring and feedback criteria,
 a charging policy and an overall policy related to how and when a capability of the service can be amended or negotiated.

\* \* \* \* \*